United States Patent
Kamura et al.

(10) Patent No.: US 6,705,763 B2
(45) Date of Patent: Mar. 16, 2004

(54) MOUNTING STRUCTURE FOR ROLLING BEARING

(75) Inventors: Kazutaka Kamura, Hiroshima (JP); Teruyuki Wakisaka, Kitakatsuragi-gun (JP); Nobuyuki Seo, Kitakatsuragi-gun (JP); Hiromi Kawanishi, Kashiwara (JP); Takahiro Umekawa, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 58 days.

(21) Appl. No.: 10/183,235

(22) Filed: Jun. 27, 2002

(65) Prior Publication Data
US 2003/0002762 A1 Jan. 2, 2003

(30) Foreign Application Priority Data

Jun. 27, 2001 (JP) ................. P2001-194300
Dec. 4, 2001 (JP) ................. P2001-369910

(51) Int. Cl.⁷ .................. F16C 13/00; F16C 43/00
(52) U.S. Cl. .................. 384/544; 384/539
(58) Field of Search .................. 384/537, 539, 384/544, 585, 589

(56) References Cited

U.S. PATENT DOCUMENTS

| 4,364,615 A | * 12/1982 | Euler ................. 384/539 |
| 4,647,230 A |   3/1987  | Friedrich et al. |
| 5,564,838 A | * 10/1996 | Caillault et al. ....... 384/585 |
| 5,927,867 A |   7/1999  | Niebling et al. |
| 6,007,253 A |   12/1999 | Rutter |
| 6,112,411 A | *  9/2000 | Rutter ................. 384/539 |
| 6,161,963 A | * 12/2000 | Doell et al. ........... 384/544 |

FOREIGN PATENT DOCUMENTS

| DE | 31 11 689 | 10/1982 |
| WO | 01/54925  | 8/2001 |

* cited by examiner

*Primary Examiner*—Thomas R. Hannon
(74) *Attorney, Agent, or Firm*—Jordan and Hamburg LLP

(57) ABSTRACT

A rolling bearing mounting structure for mounting a rolling bearing to an insertion bore has an anti-slip piece arranged on an axial end of the insertion bore, and preventing the rolling bearing from slipping out of the insertion bore toward one side of the insertion bore in a direction of the axial center; a first concave section halfway along the insertion bore in the aforementioned direction, in a circumferential direction; a second concave section opposed to the first concave section in a diameter direction on an outer peripheral surface of the outer ring member of the rolling bearing, in the circumferential direction; and an anti-slip member engaged with engagement surfaces on the first and second concave sections, respectively, and preventing the rolling bearing from slipping out of the insertion bore toward the other side of the support member in the direction of the axial center.

6 Claims, 34 Drawing Sheets

F I G. 25
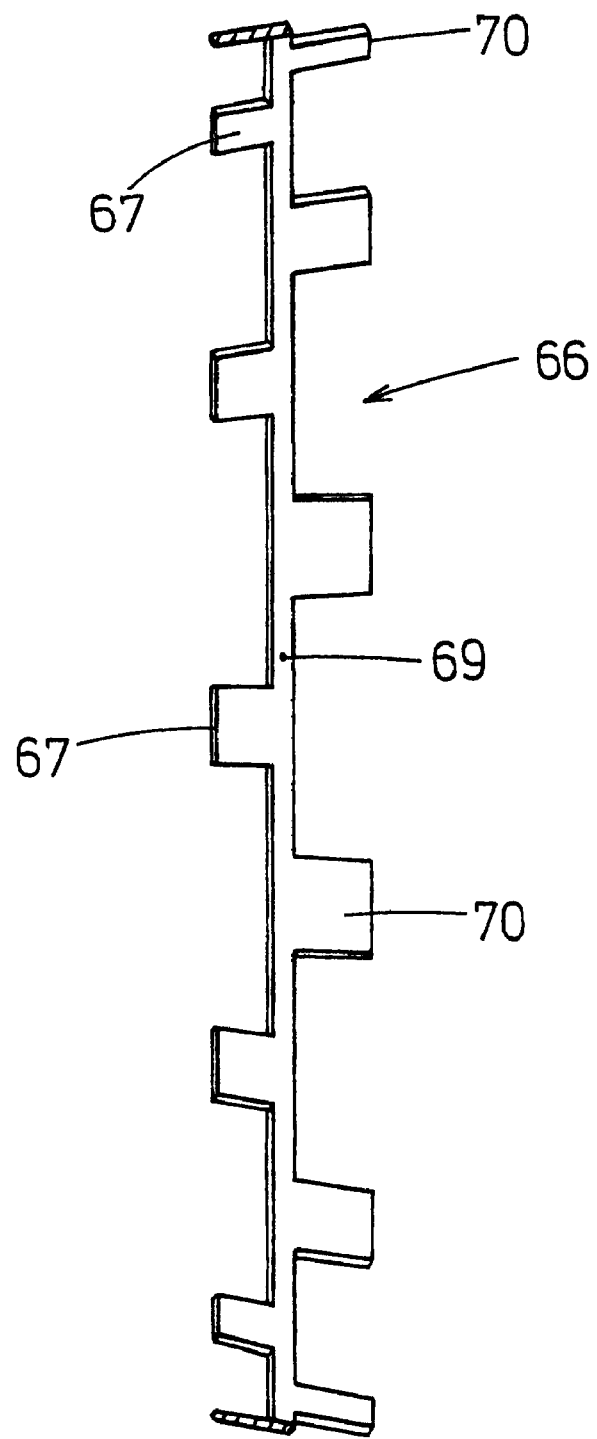

F I G. 31
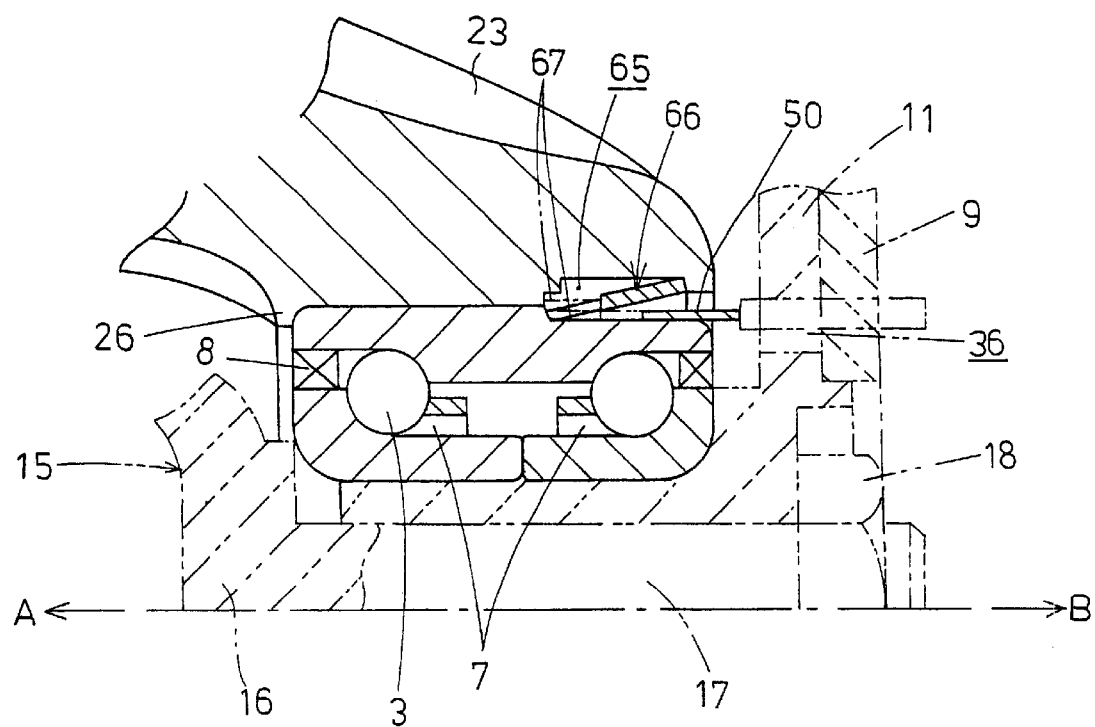

MOUNTING STRUCTURE FOR ROLLING BEARING

BACKGROUND OF THE INVENTION

1. Field of the Invention

The present invention mainly relates to a mounting structure for an axle rolling bearing.

2. Description of the Related Art

An axle rolling bearing in a vehicle has such a structure as shown in FIG. 42. This axle rolling bearing 100 includes an outer ring member 102 which is non-rotatably supported by a mounting member 101 mounted to a vehicle body (which mounting member will be referred to as "knuckle" hereinafter), an inner ring member 103 which is arranged inward in the diameter direction of the outer ring member 102, and balls 104 in a plurality of rows which can freely roll between the outer ring member 102 and the inner ring member 103.

An mounting structure for attaching the axle rolling bearing 100 constituted as stated above, to the knuckle 101 will be described below.

This mounting structure includes an annular anti-slip piece 105 which is formed by protruding the vehicle inner side A outside surface of the knuckle 101 inward in the diameter direction so as to restrict the outer member 102 from moving toward the vehicle inner side A. In addition, this mounting structure includes the following means for restricting the outer ring member 102 from moving toward a vehicle outer side B.

Specifically, this means has a sleeve 106 of an L-shaped cross section which is fitted into the vehicle outer side B edge section of the outer ring member 102, and a groove 107 which is formed in the end portion of the vehicle outer side B inner peripheral surface of the central bore of the knuckle 101. The sleeve 106 has elastic pieces 108 engaged with the groove 107 at predetermined intervals in the peripheral direction of the sleeve 106.

With this mounting structure, if the outer ring member 102 is inserted into the central bore of the knuckle 101, the elastic pieces 108 are pressed by the end portion of the outer peripheral surface of the central bore of the knuckle 101 and bent to be fall toward an axial center. If the outer ring member 102 is inserted into a predetermined position, i.e., inserted until the end portion of the outer ring member 102 abuts on the anti-slip piece 105, then the elastic pieces 108 rise by their own elastic forces and enter the groove 107. The outside surfaces of the elastic pieces 108 abutted on and engaged with the wall surface of the groove 107, whereby it is possible to prevent the outer ring member 102 from slipping out to the vehicle outer side B.

Meanwhile, recently, the reduction of axle rolling bearings of this type in the direction of the axial center is underway. With the mounting structure shown in FIG. 42, however, the bent portion of the sleeve 106 protrudes from the outside surface of the outer ring member 102 toward the vehicle outer side B by as much as the thickness thereof (as indicated by α in FIG. 42). In addition, the wall surface of the end portion of the central bore is required to have a predetermined length so as to allow the elastic pieces 108 to fall and the knuckle 101 is required to have that length in addition of the axial center accordingly.

As can be understood, if the axial width of the knuckle 101 is secured for the mounting structure, the degree of freedom of design is disadvantageously lowered.

SUMMARY OF THE INVENTION

It is, therefore, an object of the present invention to provide a mounting structure for a rolling bearing (or an axle rolling bearing, in particular) capable of decreasing the axial width of a knuckle as much as possible and improving the degree of freedom of design.

The other objects, features and advantages of the present invention will be readily apparent from the following description of the invention.

A rolling bearing mounting structure according to the present invention is for mounting a rolling bearing to an insertion bore formed in a support member, wherein the support member non-rotatably supports an outer ring member provided at the rolling bearing around an axial center, and the rolling bearing mounting structure is provided with: an anti-slip piece formed on an axial end portion of the insertion bore formed in the support member, for preventing the rolling bearing from slipping out of the insertion bore toward one of one side and the other side of the insertion bore in a direction of the axial center; a first concave section formed at a position halfway along the insertion bore in the direction of the axial center, in a circumferential direction; a second concave section formed at a position opposed to the first concave section in a diameter direction on an outer peripheral surface of the outer ring provided at the rolling bearing, in the circumferential direction; and an anti-slip member engaged with engagement surfaces formed on the first concave section and the second concave section, respectively, and preventing the rolling bearing from slipping out of the insertion bore toward the other one of one side and the other side of the support member in the direction of the axial center.

BRIEF DESCRIPTION OF THE DRAWINGS

These and other objects as well as advantages of the invention will become clear by the following description of preferred embodiments of the invention with reference to the accompanying drawings, wherein:

FIG. 25 is a longitudinal sectional view of an anti-slip member in a mounting structure according to still another preferred embodiment of the present invention;

FIG. 31 is a longitudinal sectional view showing a state in which an axle rolling bearing is withdrawn from a knuckle according to another preferred embodiment of the present invention;

In all these figures, like components are indicated by the same reference numerals.

DETAILED DESCRIPTION OF THE PREFERRED EMBODIMENTS

Figure 1:
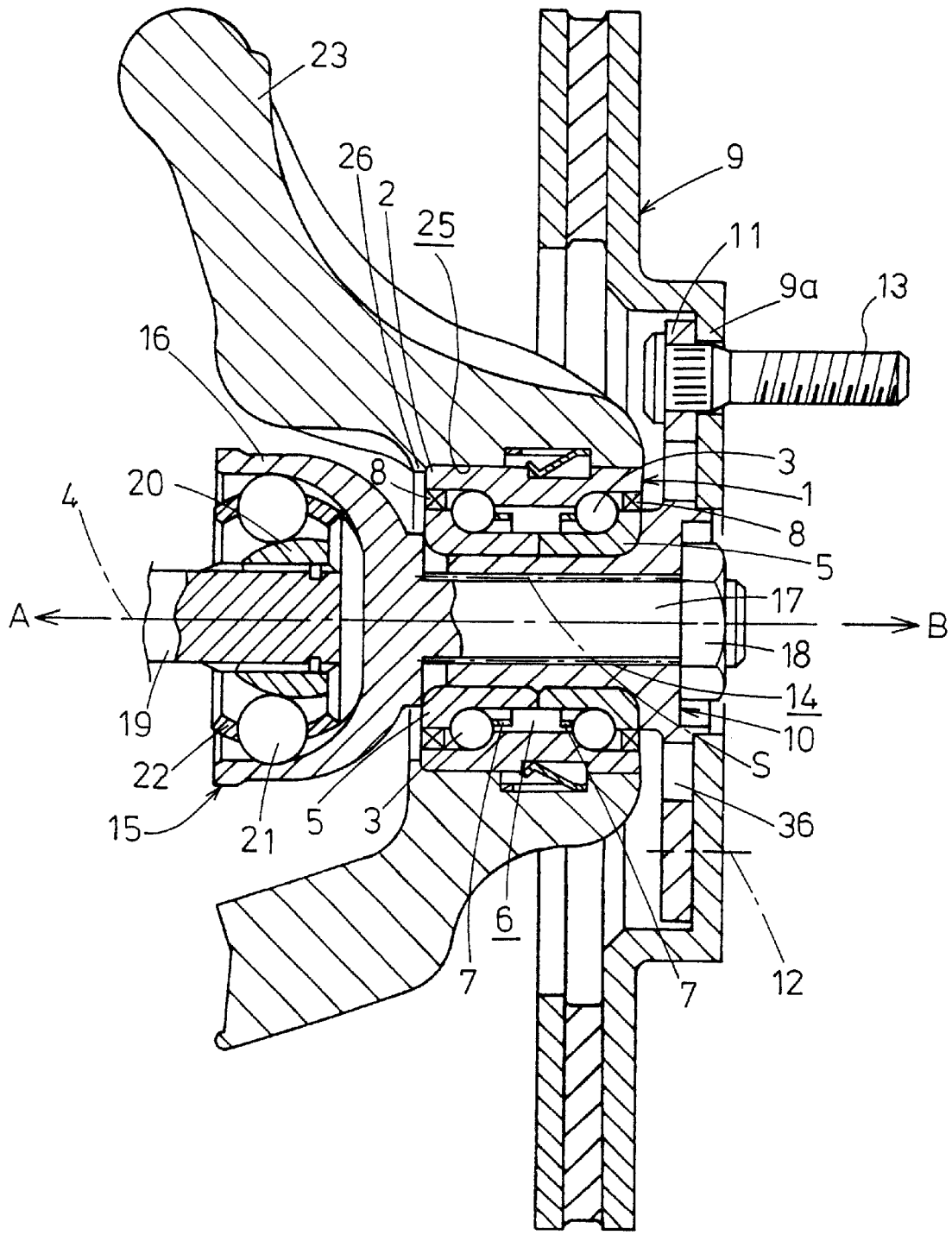
FIG. 1 is an overall longitudinal sectional view of a mounting structure for an axle rolling bearing according to one preferred embodiment of the present invention.

Referring to FIG. 1, a mounting structure for a rolling bearing according to one preferred embodiment of the present invention will be described hereinafter. In this embodiment, the rolling bearing of the present invention is applied to an axle rolling bearing 1. Therefore, the overall configuration of the axle rolling bearing 1 will first be described.

The axle rolling bearing 1 includes a single cylindrical outer ring member 2, cylindrical inner ring members 5, 5 in two rows which are arranged inward in the diameter direction of the outer ring member 2 and which are rotatably supported around an axial center 4, balls 3, 3 in two rows which are arranged to freely roll in an annular bearing space 6 between the outer ring member 2 and the both inner ring members 5, 5 (one example of rolling elements).

The balls 3, 3 in two rows are held in a cage 7 at circumferentially equidistant positions, respectively. The outer peripheral surface of each inner ring member 5, 5 is employed as the inner ring bearing surface of each ball 3, 3. The inner peripheral surface of the outer ring member 2 is employed as the outer ring bearing surface of ball 3, 3 of each row. In addition, the axle rolling bearing 1 includes a sealing member 8 which is arranged on the vehicle inner side A and vehicle outer side B end portions of an annular bearing space 6, for filling the annular bearing space 6 with lubricant and preventing the entry of slurry.

The barrel section of a hub wheel 10 which attaches a brake disc rotor 9 is press-fitted into the inner peripheral surfaces of the inner ring members 5, 5. The vehicle outer side B of this hub wheel 10 has an enlarged diameter, whereby a hub flange 11 which abuts on the attachment convex surface 9a of the brake disc rotor 9 is formed. The hub flange 11 is fixed to the brake disc rotor 9 by an attachment bolt 12. Reference symbol 13 indicates a hub bolt which fixes a tire wheel, not shown, to the brake disc rotor 9.

An axial section (axle) 17 which is formed integrally with the bowl-shaped outer ring section 16 of a uniform joint 15 provided on a vehicle body side is inserted into the central bore 14 of the hub wheel 10 by spline S-fitting. A nut 18 is engaged with the vehicle outer side B end portion of the axle 17. The fastening force of this nut 18 can prevent the axle 17 and the hub wheel 10 from separating in the direction of the axial center 4.

As the uniform joint 15, a joint referred to as "Zepper type (or Barfield type) joint" is employed. This uniform joint 15 is provided with an inner ring section 20 which fixedly inserts the end portion of a driving shaft 19 into the bowl-shaped outer ring section 16, a ball 21 which guides the hub wheel 10 aslant to the driving shaft 19 and a cage 22 for holding the ball 21.

An mounting structure for mounting the axle rolling bearing 1 to a support member (to be referred to as "knuckle" hereinafter) 23 attached to the vehicle body side is provided. An insertion bore 25 for inserting the axle rolling bearing 1 (outer ring member 2) into the knuckle 23 is formed in the knuckle 23.

The mounting structure includes an annular anti-slip piece 26 which is formed by protruding the vehicle inner side A outside surface of the knuckle 23 inward in the diameter direction. This anti-slip piece 26 is provided to prevent the axle rolling bearing 1 from moving from the knuckle 23 toward the vehicle inner side A (one side in the direction of the axial center 4).

A distance from the vehicle outer side B outside surface of the anti-slip piece 26 to the vehicle outer side B end portion of the knuckle 23 in the direction of the axial center is set equal to that of the outer ring member 2.

The mounting structure also includes the following means for restricting the axle rolling bearing from moving toward the vehicle outer side B (the other side in the direction of the axial center 4).

Figure 2:
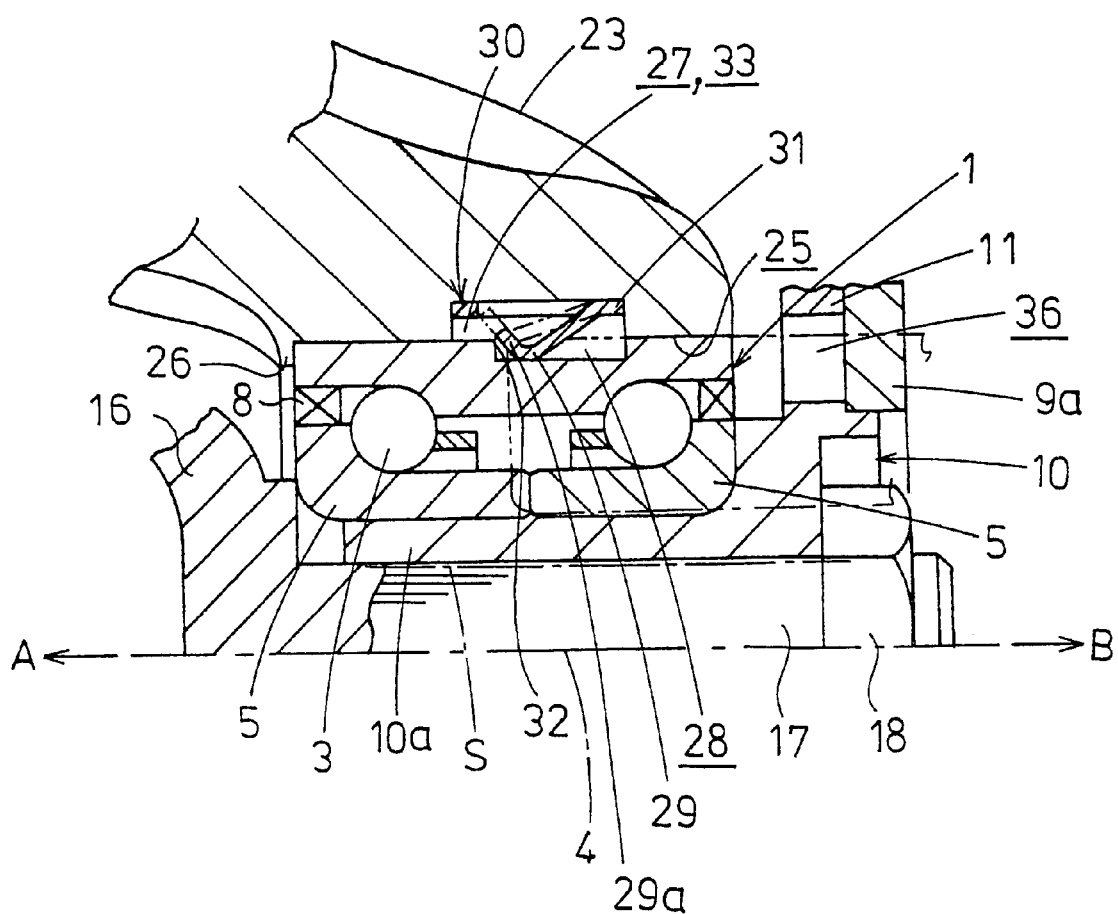
FIG. 2 is an enlarged cross-sectional view of the mounting structure part in the overall longitudinal sectional view of FIG. 1.
Figure 3:
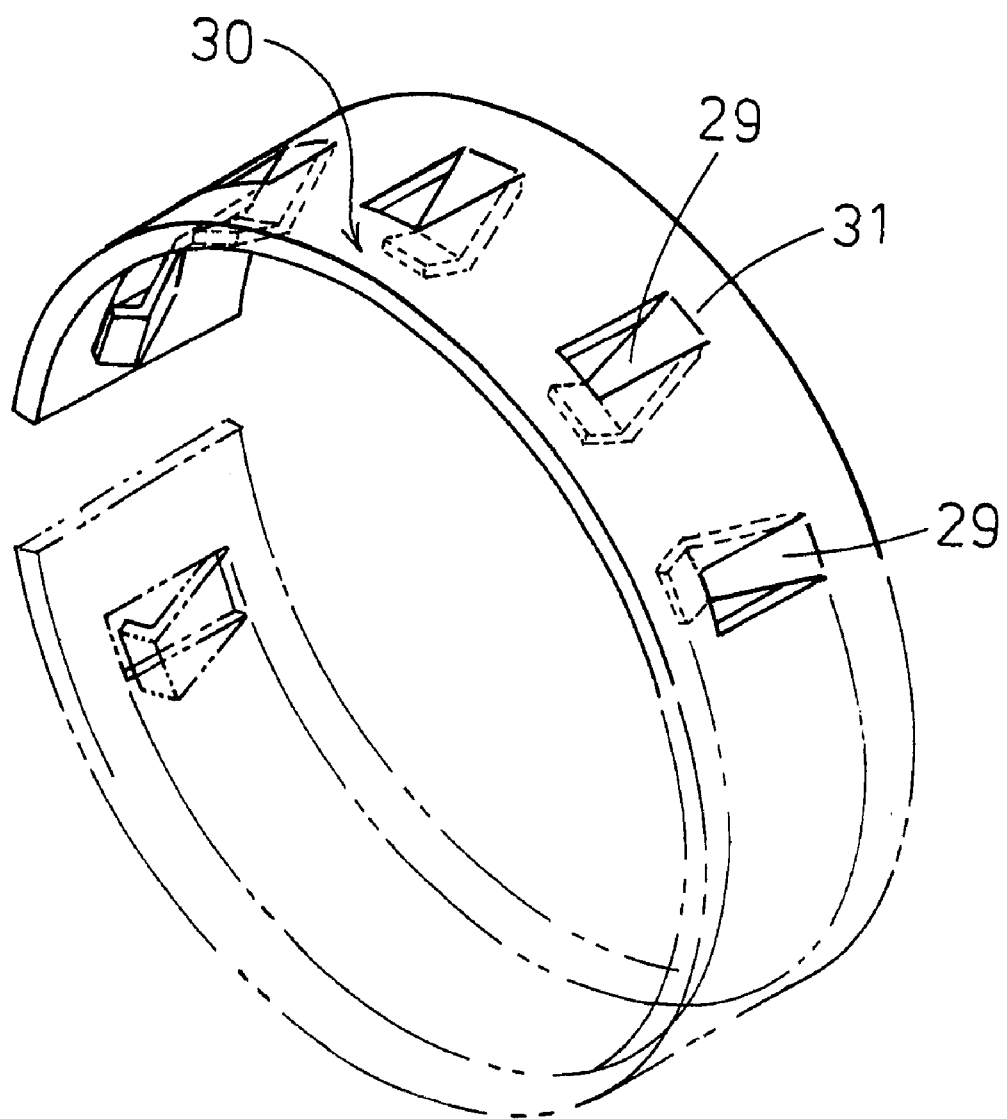
FIG. 3 is a perspective view showing only an anti-slip member which is the constituent component of the mounting structure.

As shown in FIG. 2, this means consists of an annular mounting concave section 27 serving as the first concave section which is formed halfway along the inner peripheral surface of the knuckle 23, i.e., formed circumferentially halfway along the outer peripheral surface of an insertion bore 25 formed in the central portion of the knuckle 23 and which is opened inward in the diameter direction, an annular engagement concave section 28 serving as the second concave section which is formed at a position opposed to the mounting concave section 27 halfway along the outer peripheral surface of the outer ring member 2 and which is opened outward in the diameter direction, and an anti-slip member (which is also referred to as "retainer") 30 which is fitted into the bottom of the mounting concave section 27 and which has inclined engagement sections 29 each having a reduced diameter toward the vehicle inner side A.

The inclined engagement sections 29 are formed circumferentially at equidistant positions by cutting and raising a plurality of predetermined portions from an annular main body (the base section of the anti-slip member 30) 31 at predetermined intervals (e.g., at intervals of 30 degrees in a circumferential direction), respectively. These inclined engagement sections 29 are each given a predetermined elastic force by, for example, hardening.

The vehicle inner side A sidewall of the engagement concave section 28 is formed on a surface perpendicular to the direction of the axial center 4 (which includes a radial direction). This sidewall is employed as an engagement surface 32 which the bent end portions 29a of the inclined engagement sections 29 are abutted on and thereby engaged with. The both side end portions of the main body 31 in the direction of the axial center are in a state in which they are prevented from moving in the direction of the axial center 4 by using the both sidewalls of the mounting concave section 27 as supports therefor.

As described above, the main body 31 is formed annularly. The main body 31 is cut off halfway in the direction of the axial center 4. By providing this cutoff section, the main body 31 is formed to be able to have reduced or expanded diameter per se.

The mounting concave section 27 also serves as a containing concave section 33 which contains the inclined engagement sections 29 of the anti-slip member 30 when the inclined engagement sections 29 are pressed by the vehicle inner side A outer peripheral surface of the outer ring member 2 and thereby elastically deformed while the axle rolling bearing 1 is being press-fitted into the insertion bore 25 of the knuckle 23 from the vehicle outer side B.

Reference numeral 36 shown in FIG. 2 indicates a circular arc-shaped press-fit bore. This press-fit bore 36 is arranged at a predetermined position of the hub flange 11 opposed to the outside surface of the outer ring member 2 in the direction of the axial center 4 and in the circumferential direction along with it (which predetermined position corresponds to a position between the bolt insertion bores). This press-fit bore 36 is provided to insert a press-fit tool 35 which abuts on the outside surface of the outer ring member 2 and press-fits the outer ring member 2 into the insertion bore 25 of the knuckle 23 which is provided on the vehicle body side in advance.

Figure 4:
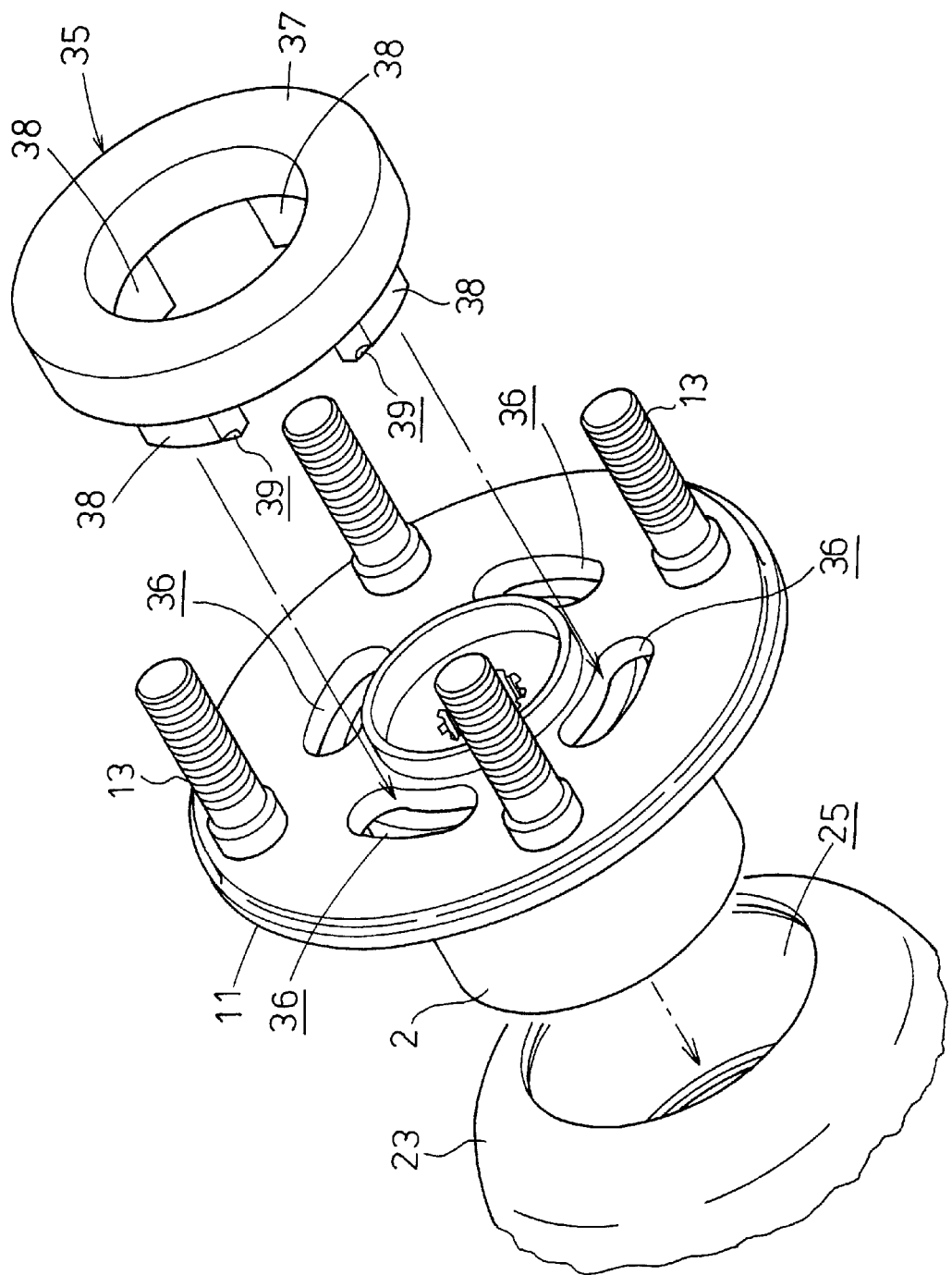
FIG. 4 is a perspective view if the axle rolling bearing is attached to a knuckle.

As shown in FIG. 4, the press-fit tool 35 consists of an annular operating section 37 on which the pressure force of a pressure unit, not shown, directly acts, and four pressure sections 38 which protrude from the side surface of this operating section 37 in the direction of the axial center 4.

Each pressure section 38 is provided to abut on the outside surface of the outer ring member 2, thereby forcing the entire axle rolling bearing 1 into the vehicle outer side B through the outer ring member 2. Each pressure section 38 is formed relatively to the press-fit bore 36 so as to be able to be inserted into the press-fit bore 36.

The thickness of the contact outside surface of each pressure section 38 in the diameter direction is set slightly larger than that of one outside surface of the outer ring member 2, and the outer peripheral corner section of the contact outside surface of each pressure section 38 is notched to have a circular arc-shaped cross section to thereby form a concave section 39. This concave section 39 slightly allows the insertion of the outer end portion of the insertion bore of the knuckle 23.

Next, a method of attaching the axle rolling bearing 1 to the knuckle 23 will be described. First, the inner ring members 5 are assembled with the outer ring member 2 through the balls 3, 3 held in the cages 7, 7, respectively, thereby forming the axle rolling bearing 1. The axial section 10a of the hub wheel 10 is press-fit into the central bores of the inner ring members 5, 5, respectively, from the vehicle outer side B, thereby providing a hub unit in which the axle rolling bearing is integrated with the hub wheel.

Separately from the above, the anti-slip member 30 is inserted into the insertion bore 25 of the knuckle 23 from the vehicle outer side B with the diameter reduced against its elastic force and then fitted into the mounting concave section 27 which is formed halfway along the inner peripheral surface of the knuckle 23. At this moment, the anti-slip member 30 is attached to the knuckle 23 in such a direction in which the diameters of the inclined engagement sections 29 are reduced on the vehicle inner side A.

Figure 5:
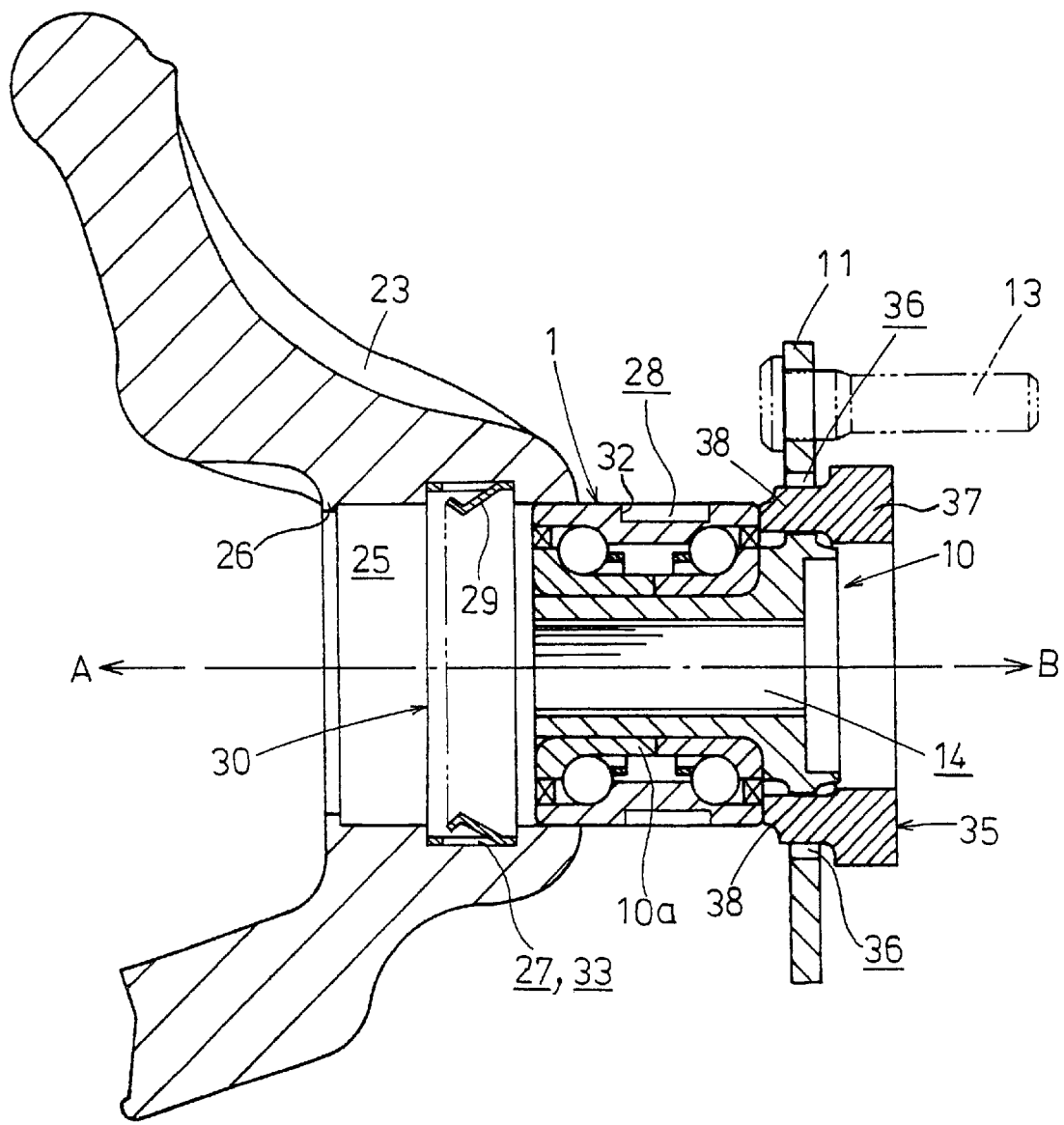
FIG. 5 is a longitudinal section view showing if the axle rolling bearing is attached to the knuckle.
Figure 6:
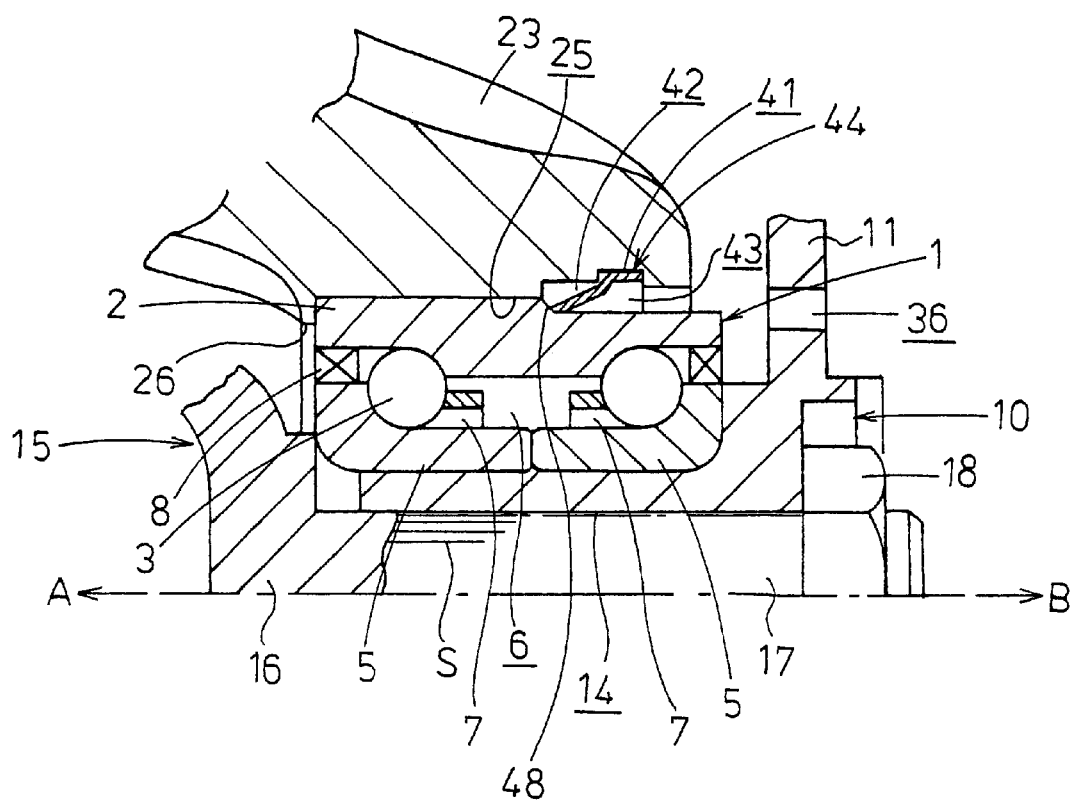
FIG. 6 is a longitudinal sectional view of a mounting structure for an axle rolling bearing according to another preferred embodiment of the present invention.

As shown in FIG. 5, the center of the axle rolling bearing 1 is then stabilized relative to the insertion bore 25 of the knuckle 23. Each of the pressure sections 38 of the press-fit tool 35 is inserted into the press-fit bores 35 of the hub flange 11, respectively and abutted on the outside surface of the outer ring member 2. The operating section 37 of the press-fit tool 36 is sequentially pressed toward the vehicle inner side A by the pressure unit, and the vehicle inner side A outside surface of the outer ring member 2 is abutted on the anti-slip piece 26 of the knuckle 23.

As a result, the axle rolling bearing 1 is retained in the vehicle outer side B toward the knuckle 23. Since the distance from the vehicle outer side A outside surface of the anti-slip piece 26 of the knuckle 23 to the vehicle outer side A end portion of the knuckle 23 is set equal to that of the outer ring member 2 in the direction of the axial center 4, the vehicle outer side end portion of the knuckle 23 and that of the axle rolling bearing 1 are located in the same plane in the diameter direction.

If the axle rolling bearing 1 formed as a hub unit is press-fitted into the insertion bore 25 of the knuckle 23 from the vehicle outer side B, the inclined engagement sections 29 of the anti-slip member 30 are pressed by the outer peripheral surface of the outer ring ember 2, elastically deformed as indicated by a virtual line shown in FIG. 2, evaded and contained in the containing concave section 33, which state is maintained. Further, by forcing the axle rolling bearing 1 into the insertion bore 25 of the knuckle 23, the inclined engagement sections 29 release from the outer peripheral surface of the outer ring member 2 by their elastic forces, and enter the engagement concave section 28, whereby the outside surfaces of the inclined engagement sections 29 abut on the engagement surface 32 (vehicle inner side A sidewall) of the engagement concave section 28. The engagement force for engaging the outside surfaces of the inclined engagement section 29 with the engagement surface 32 can prevent the axle rolling bearing 1 (hub unit) from slipping out from the knuckle 23 to the vehicle outer side B.

A state in which the inclined engagement sections 29 enter the engagement concave section 28 by their elastic forces, is equal to a state in which the vehicle inner side A outside surface of the outer ring member 2 abuts on the anti-slip piece 26. Consequently, it is possible to prevent the axle rolling bearing 1 (hub unit) from slipping out of the knuckle 23 to the vehicle inner side A and the vehicle outer side B.

As can be seen, according to this embodiment, the mounting structure which consists of the annular anti-slip piece 26 formed by protruding the vehicle inner side A outside surface of the knuckle 23 inward in the diameter direction, the mounting concave section 27 formed halfway along the inner peripheral surface of the knuckle 23 in the circumferential direction thereof, the engagement concave section 28 formed at the position opposed to the mounting concave section 27 halfway along the outer peripheral surface of the outer ring member 2, and the anti-slip member 30 having inclined engagement sections 29 fitted into the bottom of the mounting concave section 27 and having reduced diameters toward the vehicle inner side A, can prevent the axle rolling bearing 1 from slipping out of the knuckle 23 in the direction of the axial center 4.

Figure 42:
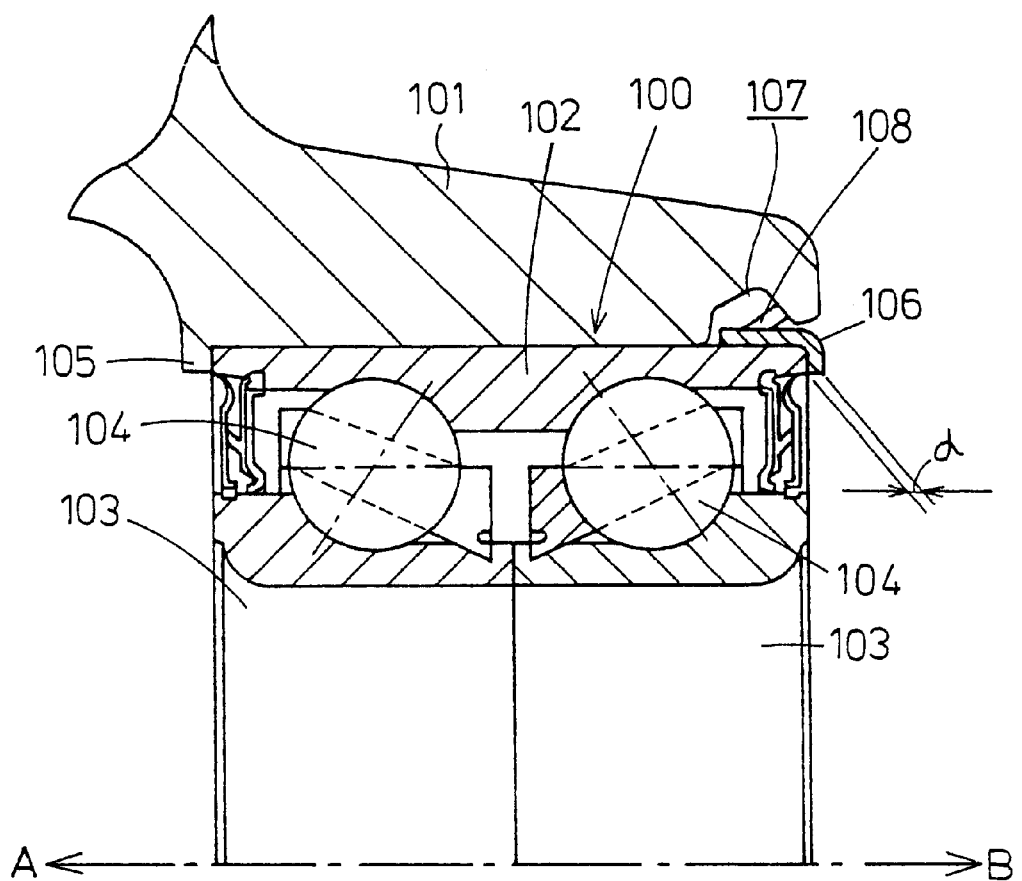
FIG. 42 is a longitudinal sectional view showing a conventional mounting structure.

Further, as stated above, if the axle rolling bearing 1 (outer ring member 2) is inserted into the insertion bore 25 of the knuckle 23 until the vehicle inner side A outside surface of the axle rolling bearing 1 abuts on the anti-slip piece 26, the vehicle outer side B outside surface of the knuckle 23 and that of the axle rolling bearing 1 are consistent with each other in the direction of the axial center 4 and located in the same plane in the diameter direction. Due to this, unlike the conventional structure shown in FIG. 42, it does not occur that the bent section of the sleeve protrudes from the outside surface of the outer ring member toward the vehicle outer side B by as much as the thickness thereof.

Furthermore, according to the conventional art, the end portion of the sidewall of the central bore is required to have a predetermined length so as to make the elastic piece fall sideways, and the knuckle is required to have that the length in a direction of the axial center. In this embodiment, by contrast, the vehicle outer side B outside surface of the knuckle 23 and that of the axle rolling bearing 1 can be set consistent with each other in the direction of the axial center 4 and located in the same plane in the diameter direction. It is, therefore, possible to reduce the size of the knuckle 23 and to thereby improve the degree of freedom of design.

The predetermined elastic force applied to above-mentioned inclined engagement section 29 is required to maintain a state in which the outside surface of the inclined engagement section 29 is abutted on and engaged with the engagement surface 32 of the engagement concave section 28 even if a force for moving the axle rolling bearing 1 toward the vehicle outer side B acts on the axle rolling bearing 1 at the time of using the axle rolling bearing 1 by attaching the bearing 1 to the vehicle.

Further, if the axle rolling bearing 1 is withdrawn from the knuckle 23 for maintenance, the withdrawal is conducted by pulling out the axle rolling bearing 1 toward the vehicle outer side B against the predetermined elastic forces of the inclined engagement sections 29, i.e., the engagement force for engaging the inclined engagement sections 29 with the engagement surface 32. During the withdrawal, the bent sections of the inclined engagement sections 29 overpass the engagement surface 32 of the engagement concave section 28, and the inclined engagement sections 29 are contained again in the mounting concave section 27. In this state, the inclined engagement sections 29 are pressed by the outer peripheral surface of the outer ring member 2, thereby sliding the inclined engagement sections 29.

After attaching the axle rolling bearing 1 to the knuckle 23, the axial section 17 of the uniform joint 15 is fitted into the central bore 14 of the hub wheel 10 by spline S-fitting. The nut 18 is engaged with the vehicle outer side B outside surface of the axial section 17. The fastening force applies predetermined pre-load to the balls 3, 3 in respective rows and connects the axial section 17 to the hub wheel 10 in the direction of the axial center 4 in an inseparable fashion.

Moreover, if the axle rolling bearing 1 is press-fitted into the insertion bore 25 of the knuckle 23, the pressure sections 38 of the press-fit tool 35 are inserted into the respective press-fit bores 36 to be abutted on the outside surface of the outer ring member 2, thereby pressing the overall axle rolling bearing 1 through the outer ring member 2. It is, therefore, possible to press-fit the axle rolling bearing 1 into the insertion bore 25 of the knuckle 23 without damaging the balls 3, 3 in the respective rows and with simple operation.

Furthermore, it is possible to ensure press-fitting the axle rolling bearing 1 into the insertion bore 25 of the knuckle 23 using the press-fit tool 35 with the simple configuration in which the pressure sections 38 inserted into the press-fit bores 36 formed in the hub flange 11 are provided.

A mounting structure according to another preferred embodiment will be described below with reference to FIGS. 6 to 9. The mounting structure in this embodiment includes an annular mounting concave section 41 which is formed on the vehicle outer side B inner peripheral surface of a knuckle 23, a containing concave section 42 which is formed on the vehicle inner side A of the mounting concave section 41 and which has a smaller diameter than that of the mounting concave section 41, an engagement concave section 43 which is formed annularly by reducing the diameter of the vehicle outer side B outer peripheral surface of the outer ring member 2, an anti-slip member 44 which is attached to the mounting concave section 41, and an annular anti-slip piece 26 which is formed by protruding the vehicle inner side A outside surface of the knuckle 23 inward in a diameter direction.

Figure 7:
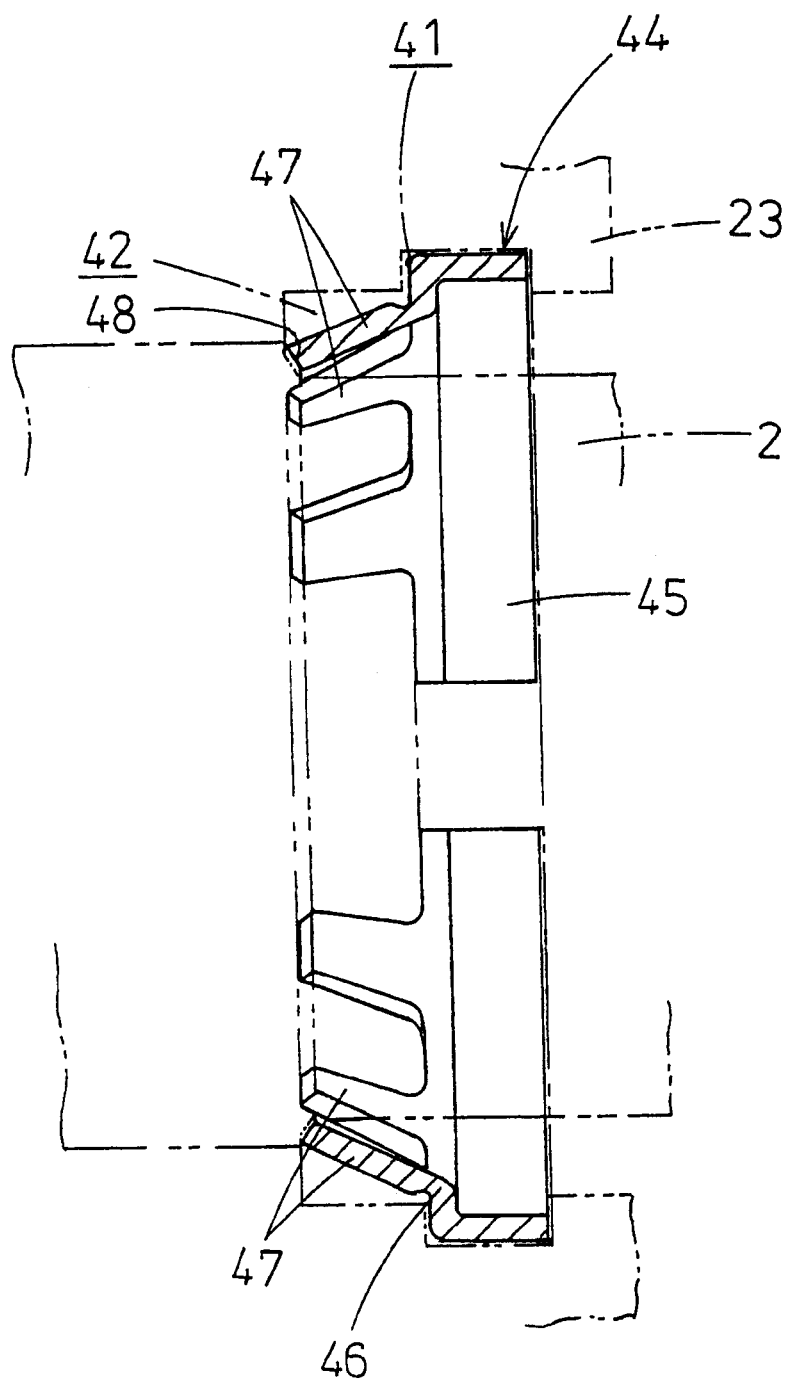
FIG. 7 is an enlarged, longitudinal sectional view of an anti-slip member which is the constituent component of the mounting structure shown in FIG. 6.
Figure 8:
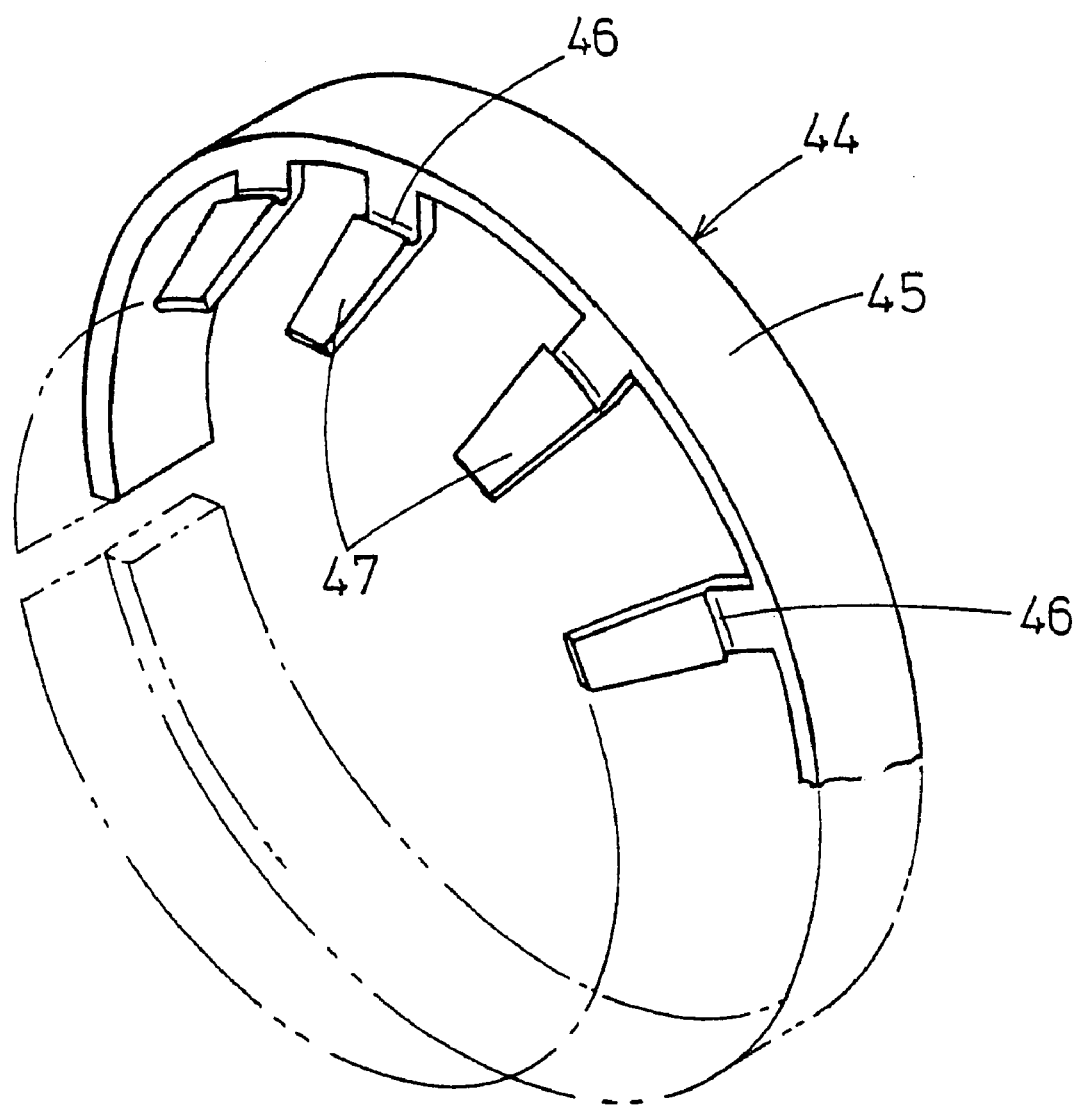
FIG. 8 is a partially cutaway, perspective view of the anti-slip member shown in FIG. 7.

As shown in FIGS. 7 and 8, the anti-slip member 44 consists of a main body 45 and inclined engagement sections 47. The continuous section in which the inclined engaged sections 47 are continuous to the main body 45, is notched in a circular arc manner to be thereby formed into a thin, fragile section 46 compared with the other sections. The inclined engagement sections 47 are formed at equidistant positions of the main body 45 in the circumferential direction thereof.

The containing concave section 42 is provided to contain the inclined engaged sections 47 of the anti-slip member 44 after the inclined engagement sections 47 are pressed by the outer peripheral surface of the outer ring member 2 and elastically deformed if an axle rolling bearing 1 is forced into the insertion bore 25 of the knuckle 23 from the vehicle outer B side.

An engagement surface 48 which is the outside surface of the engagement concave section 43 is inclined to have an expanded diameter toward the vehicle inner side A. Since the remaining components are the same as those in the embodiment shown in FIGS. 1 to 5, they are indicated by the same reference numerals, respectively and will not be described herein.

With the above-stated configuration, if the axle rolling bearing 1 is attached to the knuckle 23, the anti-slip member 44 is first attached to the knuckle 23. In the attachment of the anti-slip member 44 to the knuckle 23, the anti-slip member 44 is inserted into the mounting concave section 41 while the anti-slip member 44 is kept to have a reduced diameter so that the diameters of the inclined engagement section 47 of the anti-slip member 44 are reduced toward the vehicle inner side A. Thereafter, the anti-slip member 44 is restored so that the diameter thereof is expanded by its elastic force, thereby fitting the anti-slip member 44 into the mounting concave section 41. The end portions on the both sides of the main body 45 are supported by the support sections which are both sidewalls of the mounting concave section 41 and suppressed from moving in the direction of an axial center 4.

Next, using a press-fit tool 35 shown in FIGS. 4 and 5, the axle rolling bearing 1 is forced into the insertion bore 25 of the knuckle 23 from the vehicle outer side B. If so, the inclined engagement sections 47 are pressed by the outer peripheral surface of the outer ring member 2, elastically deformed, and contained in the containing concave section 42. The inclined engagement sections 47 enter the engagement concave section 43 by their elastic forces at positions consistent with the position at which the end portion of the inner ring member 2 abuts on the anti-slip piece 26. The outside surfaces of the inclined engagement section 47 are abutted on and engaged with the engagement surface 48. As a result, it is possible to prevent the axle rolling bearing 1 from slipping out of the knuckle 23 toward the vehicle outer side B.

According to this embodiment, the knuckle 23 can be reduced in size as in the case of the preceding embodiment, so that the degree of freedom of design can be improved.

Further, if the axle rolling bearing 1 is withdrawn from the knuckle 23 for maintenance, the axle rolling bearing 1 is pulled out toward the vehicle outer side B against the predetermined elastic forces of the inclined engagement sections 47 to thereby break it in the fragile section 46.

Figure 9:
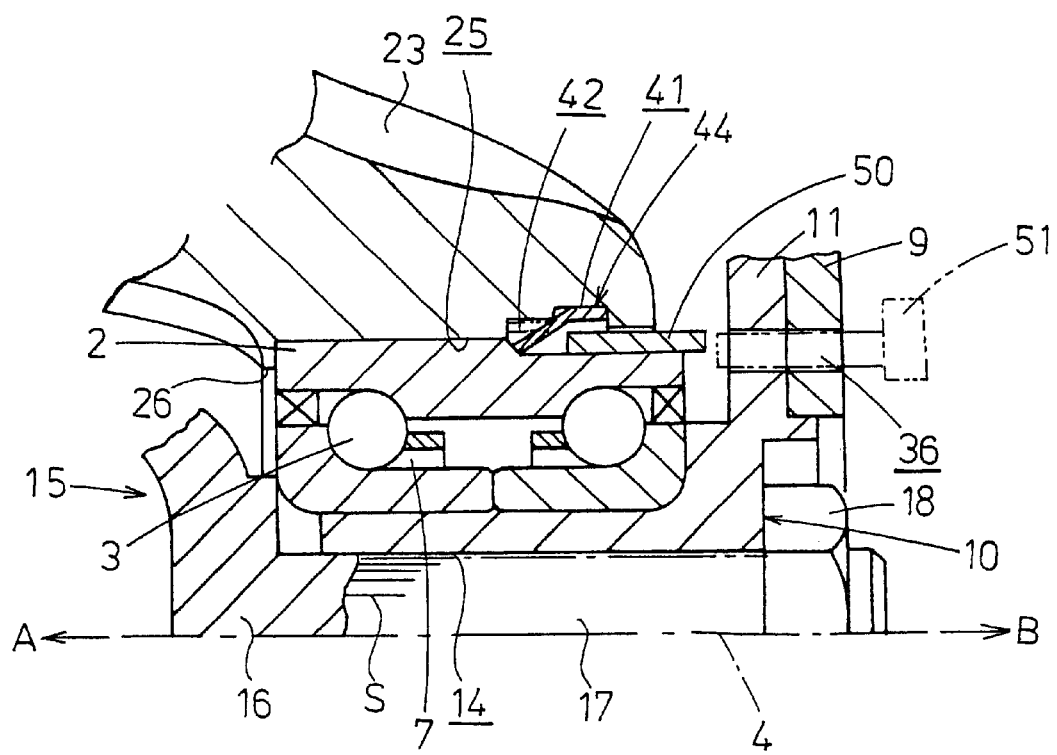
FIG. 9 is a longitudinal sectional view showing a manner in which the axle rolling bearing is withdrawn from the knuckle.

Alternatively, as shown in FIG. 9, the axle rolling bearing 1 maybe withdrawn from the knuckle 23 using, for example, a release tool 50. Specifically, the release tool 50 is inserted through the press-fit bore 36 formed in a hub flange 11, and forced into the clearance between the knuckle 23 and the outer ring member 2 until the tip end portion of the release tool 50 contacts with the inclined engagement sections 47.

Next, a press-fit tool 51 as indicated by the virtual line shown therein is inserted into the press-fit bore 36 from the vehicle outer side B and the press-fit tool 51 is further forced into the press-fit bore 36 by a predetermined pressure unit. The inclined engagement sections 47 are elastically deformed by forcing the press-fit tool 51 into the press-fit bore 36, the outside surfaces of the inclined engagement sections 47 are released from the engagement surface 48, and the inclined engagement sections 47 are contained in the containing concave section 42, whereby the engagement state in which the inclined engagement sections 47 are engaged with the engagement surface 48 is released. In this way, while disengaging the inclined engagement sections 47 from the engagement surface 48, the axle rolling bearing 1 is pulled out from the knuckle 23.

By doing so, it is possible to withdraw the axle rolling bearing 1 from the knuckle 23 only by a force equal to a force with which the axle rolling bearing 1 is press-fitted into the knuckle 23 but opposite in direction, without breaking the anti-slip member 44.

Figure 10:
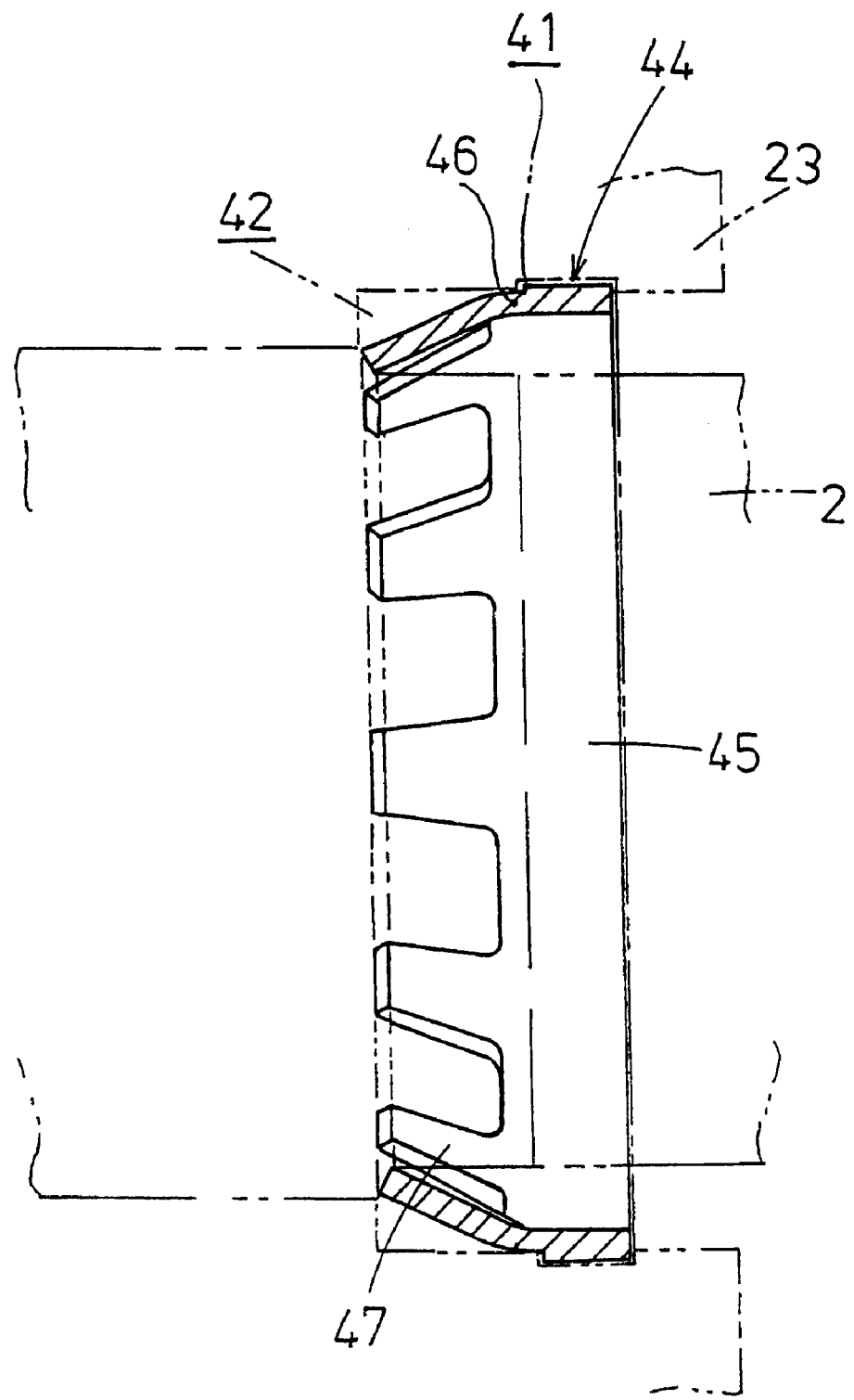
FIG. 10 is a longitudinal sectional view of an anti-slip member in a mounting structure according to another preferred embodiment of the present invention.

In this embodiment, the continuous section in which the inclined engagement sections 47 of the anti-slip member 44 in the mounting structure are continuous to the main body 45 is notched into circular arc shape to thereby make the continuous section thinner than the other sections and to provide a fragile section 46. However, the anti-slip member 44 is not limited to the above-stated configuration. As shown in FIG. 10, the continuous section in which the inclined engagement sections 47 are continuous to the main body 45 may be notched to form a height difference portion to thereby provide a fragile portion 46 thinner than the remaining sections.

Figure 11:
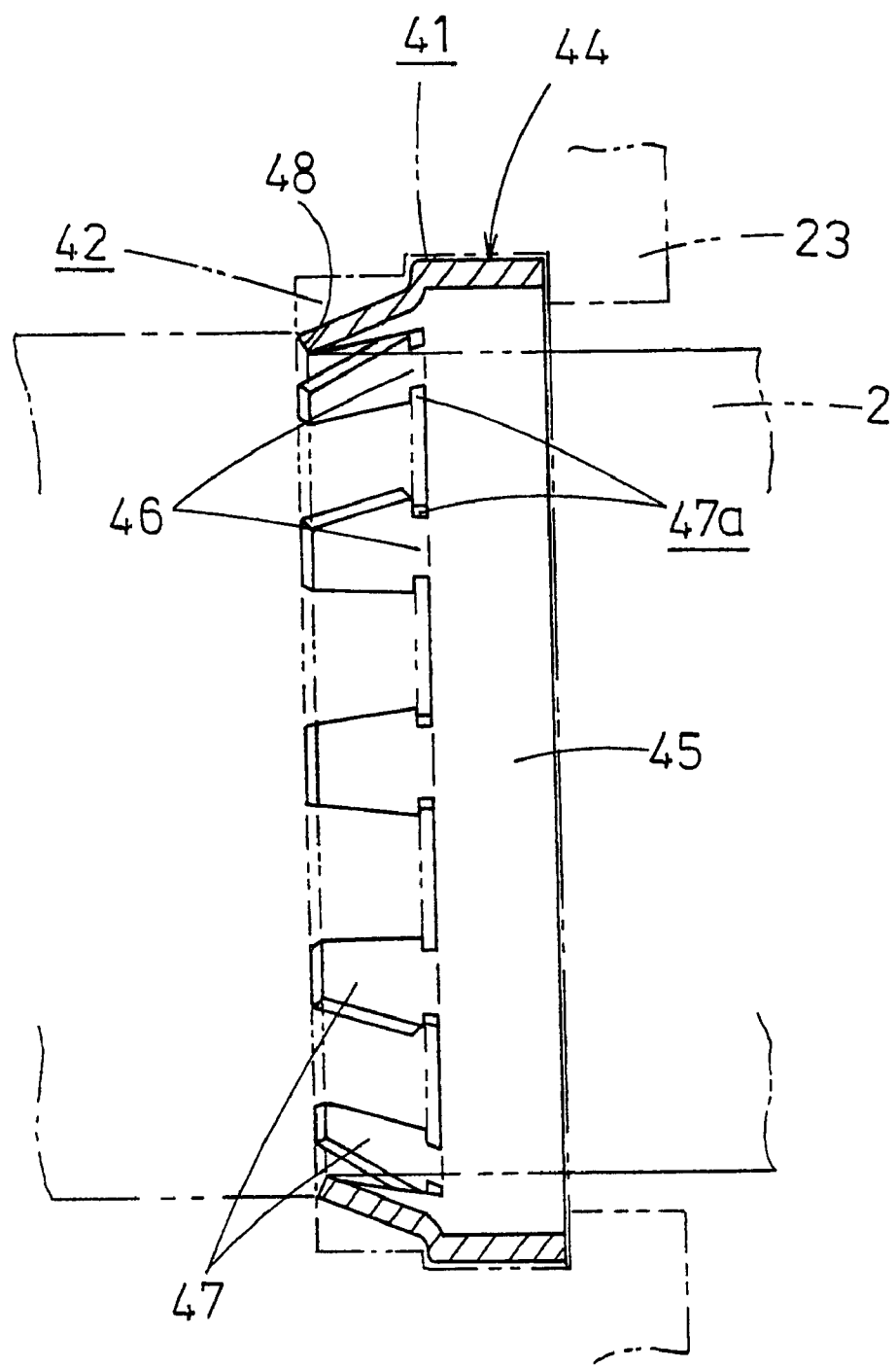
FIG. 11 is a longitudinal section view of an anti-slip member in a mounting structure according to still another preferred embodiment of the present invention.
Figure 12:
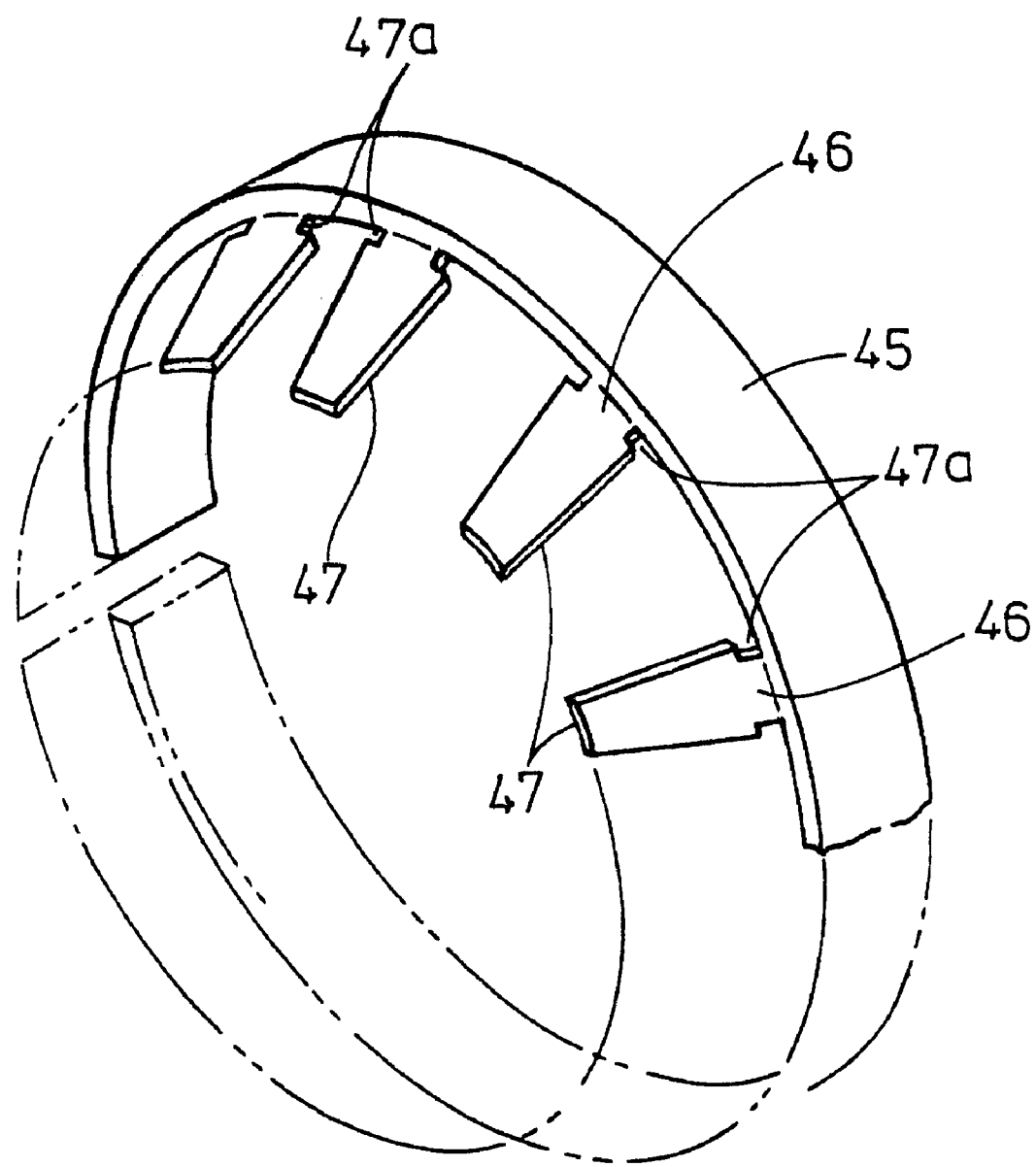
FIG. 12 is a partially cutaway, perspective view of the anti-slip member shown in FIG. 11.

FIGS. 11 and 12 show the shape of an anti-slip member 44 in yet another embodiment. The anti-slip member 44 shown therein consists of a main body 45 which is cut off halfway in a circumferential direction along the direction of the axial center 4, and inclined engagement sections 47 continuous to the main body 45 through a fragile section 46. The main body 45 is formed so that the diameter thereof can be reduced or enlarged by providing the cutoff section.

The fragile section 46 of the anti-slip member 44 is a continuous section in which the main body 45 are continuous to the inclined engagement sections 47. By providing trapezoidal notch grooves 47a on both sides thereof in the circumferential direction, the section 46 become fragile. The inclined engagement sections 47 are formed by bending the main body 45 at a predetermined angle with respect to the axial center 4 around the fragile section 46. The inclined engagement sections 47 are formed circumferentially at equidistant positions on the main body 45 at predetermined intervals.

Figure 13:
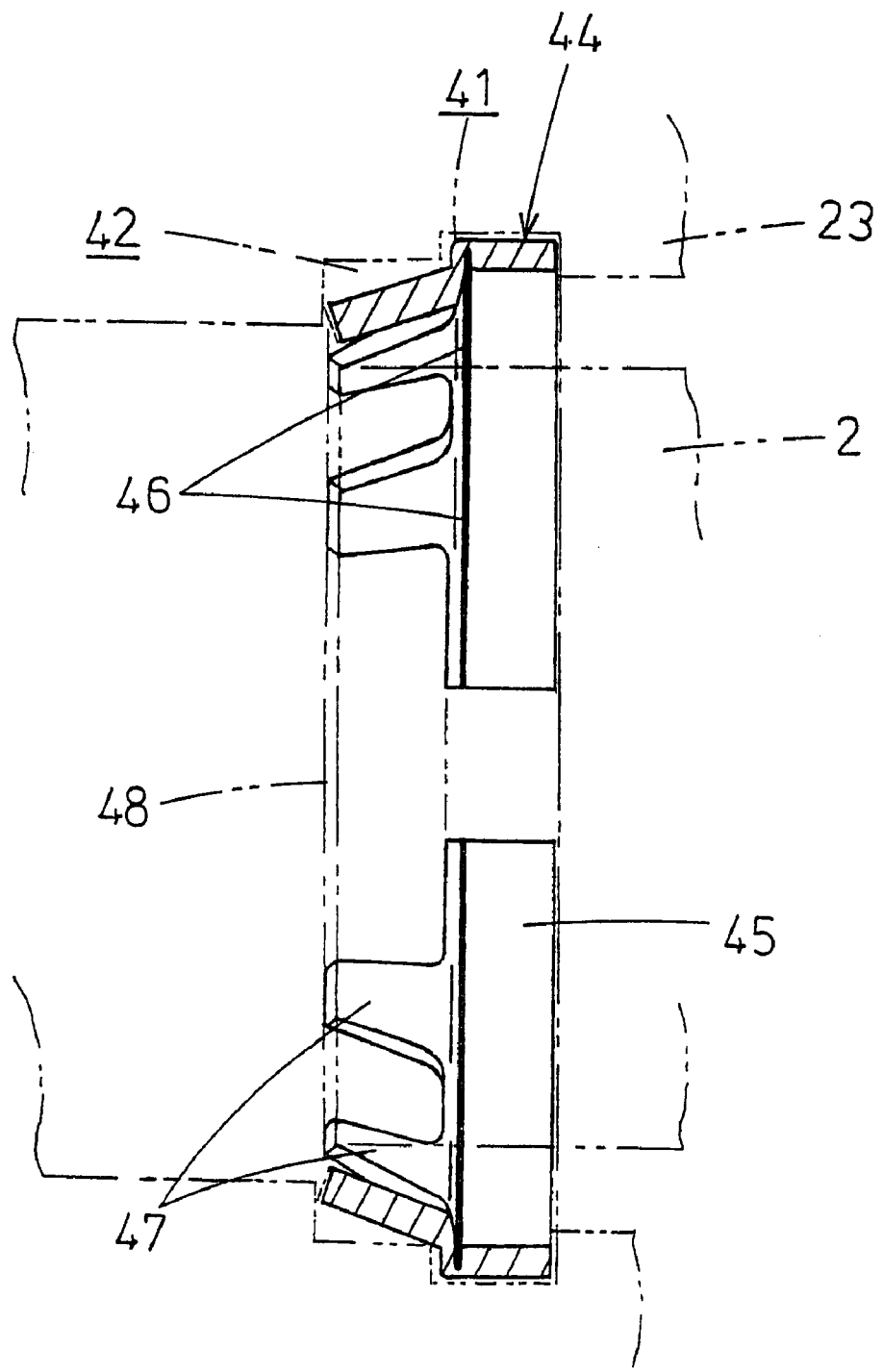
FIG. 13 is a longitudinal sectional view of an anti-slip member in a mounting structure according to still another preferred embodiment of the present invention.
Figure 14:
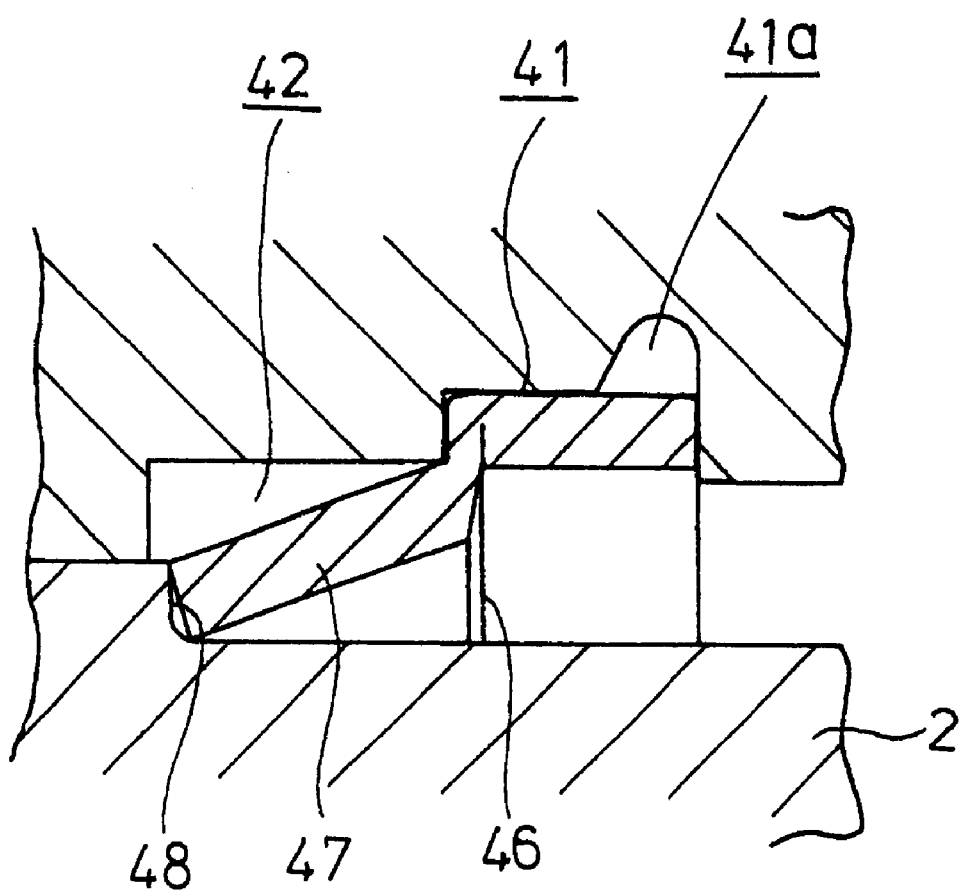
FIG. 14 is an enlarged, longitudinal sectional view showing a state in which the anti-slip member shown in FIG. 13 is used.

FIGS. 13 and 14 show still another embodiment of an anti-slip member 44. The anti-slip member 44 shown therein has a thin, fragile section 46 between a main body 45 and inclined engagement sections 47. This fragile section 46 is bent inward in a diameter direction. A mounting concave section 41 has a concave section 41a which is concave outward in the diameter direction so as to ensure supporting the anti-slip member 44 in the direction of an axial center.

Figure 15:
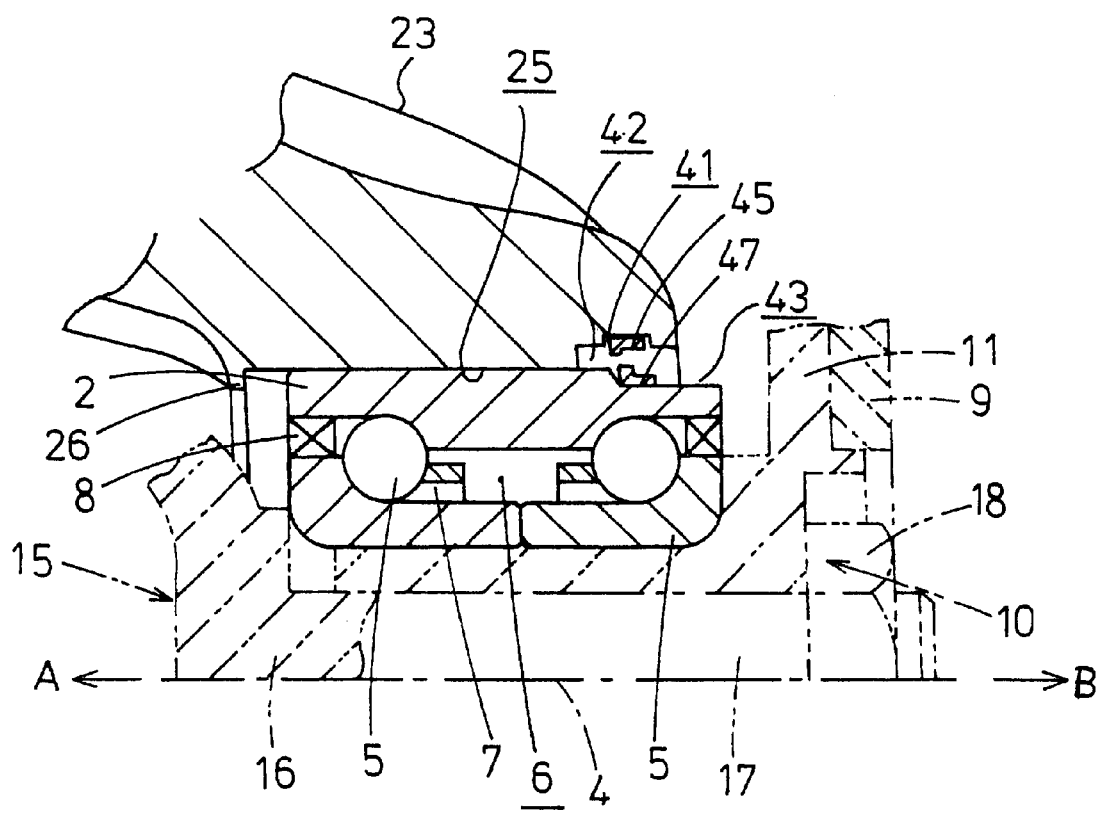
FIG. 15 is a longitudinal sectional view showing a manner in which the rolling bearing is withdrawn from the knuckle.

FIG. 15 shows that the axle rolling bearing 1 is attached to the knuckle 23 using the anti-slip member 44 in the embodiments shown in FIGS. 11 to 14 and then withdrawn from the knuckle 23.

In this case, by pulling out the axle rolling bearing 1 from the knuckle 23 against the elastic forces of the inclined engagement sections 47, the anti-slip member 44 is cut off at the fragile section 46 thereof, the inclined engagement sections 47 are pulled out together with the axle rolling bearing 1 and the main body 45 is left in the mounting concave section 41. The main body 45 which is left in the mounting concave section 41 is withdrawn by reducing the diameter thereof using a predetermined tool. When the axle rolling bearing 1 is attached to the knuckle 23 next time, a new anti-slip member 44 is attached to the mounting concave section 41 in advance.

Figure 16:
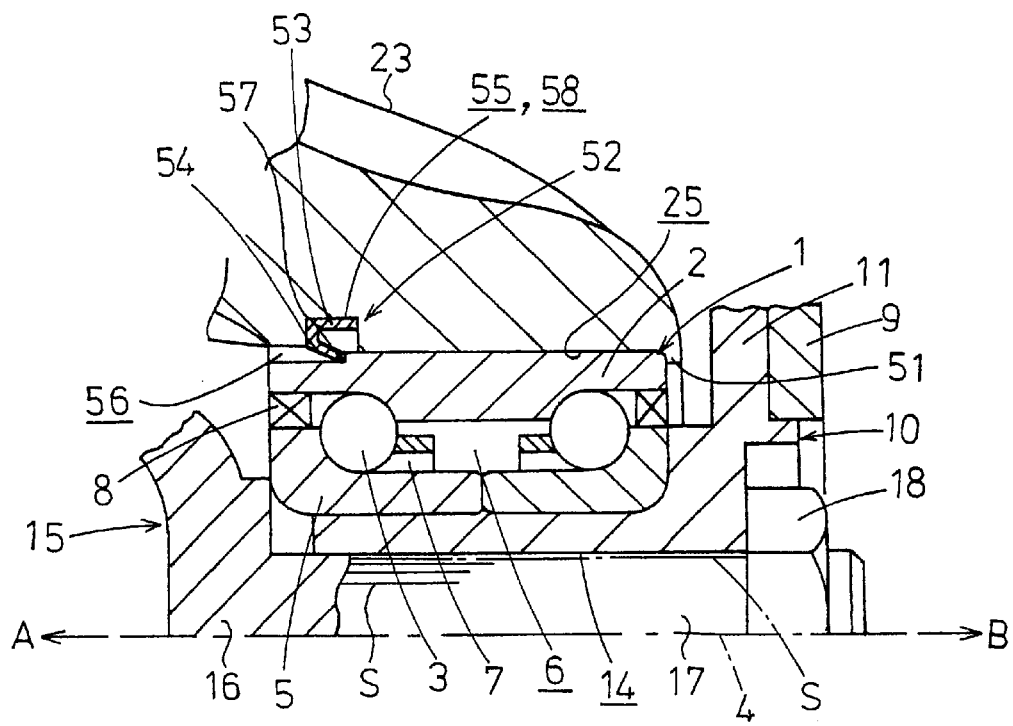
FIG. 16 is a longitudinal sectional view of a mounting structure according to still another preferred embodiment of the present invention.
Figure 17:
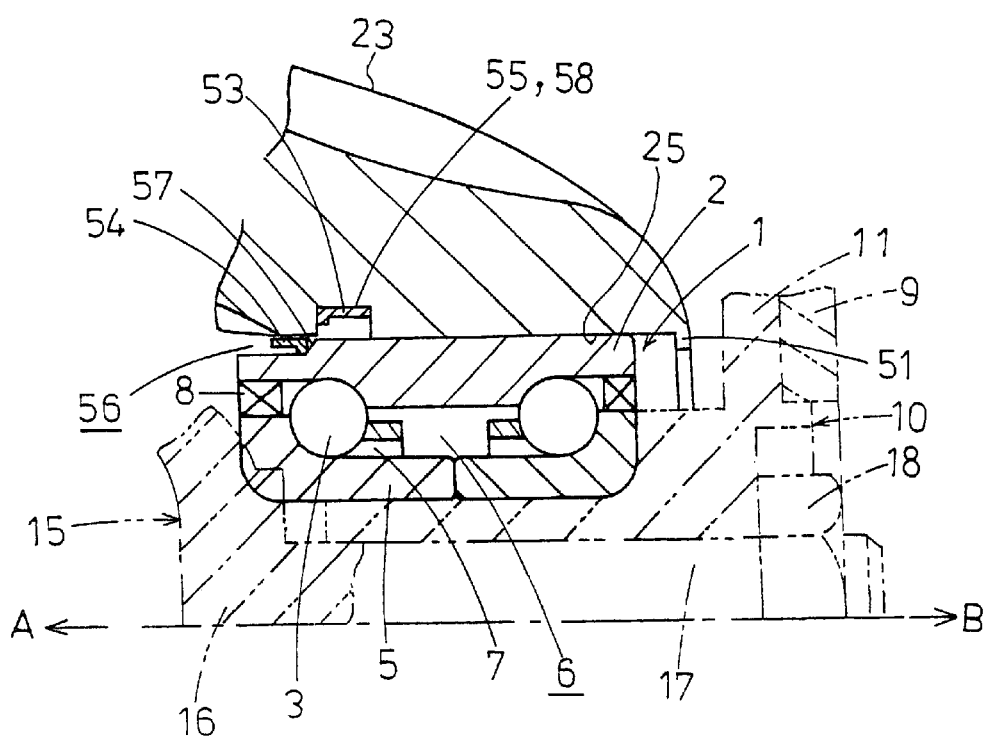
FIG. 17 is a longitudinal sectional view showing a manner in which a rolling bearing is withdrawn from a knuckle.

A mounting structure according to still another embodiment will be described with reference to FIGS. 16 to 17. The mounting structure in this embodiment includes an anti-slip piece 51 which is formed on the vehicle outer side B end portion of a knuckle 23 (on one side in the direction of an axial center 4), an anti-slip member 52, a mounting concave section 55 for attaching the anti-slip member 52, and an engagement concave section 56 for the anti-slip member 52.

The anti-slip member 52 consists of an annular main body 53, and inclined engagement sections 54 which are formed on the tip end of a continuous section formed by bending the vehicle inner side A (the other side in the direction of the axial center 4) of the main body 53 inward in a diameter direction so that the diameters of the inclined engagement sections 54 are reduced toward the vehicle outer side B.

As in the case of the preceding embodiments, the main body 53 is formed annularly and cut off halfway along the direction of the axial center 4. By providing this cutoff section, the main body 53 is formed to be able to have a reduced or enlarged diameter. The inclined engagement sections 54 are formed, at predetermined intervals, on the main body 53 in the circumferential direction thereof.

The mounting concave section 55 for attaching the anti-slip member 52 is formed on the vehicle inner side A inner peripheral surface of the knuckle 23. The engagement concave section 56 is formed by working the vehicle inner side A inner peripheral surface of the outer ring member 2 to have a reduced diameter compared with the remaining sections. An engagement surface 57 is an inclined surface which has an enlarged diameter toward the vehicle outer side B.

The mounting concave section 55 also serves as a containing concave section 58 which contains the inclined engagement sections 54 of the anti-slip member 52 when the inclined engagement sections 54 are pressed by the vehicle inner side A outer peripheral surface of the outer ring member 2 and thereby elastically deformed while the axle rolling bearing 1 is being press-fitted into the insertion bore 25 of the knuckle 23 from the vehicle inner side B. Since the remaining constituent components are the same as those in the preceding embodiments, they are indicated by the same reference numerals, respectively and will not be described herein.

With the above-stated configuration, if the axle rolling bearing 1 is attached to the knuckle 23, the anti-slip member 52 is attached to the mounting concave section 55 in advance. If the axle rolling bearing 1 is inserted into the insertion bore 25 of the knuckle 23 from the vehicle inner side A, the inclined engagement sections 54 are pressed by the outer peripheral surface of the outer ring member 2, contained in the containing concave section 58, and engaged with the engagement surface 57 of the engagement concave section 56 at a position at which the vehicle outer side B outside surface of the outer ring member 2 abuts on the anti-slip piece 51. As a result, it is possible to prevent the axle rolling bearing 1 from moving in the direction of the axial center 4.

If the axle rolling bearing 1 is withdrawn from the knuckle 23, an axial section 17 which is formed on the bowl-shaped outer ring section 16 of a uniform joint 15 is detached, a hub wheel 10 is detached and then the inclined engagement sections 54 of the anti-slip member 52 are pushed up using a release tool 50 as shown in FIG. 9. Alternatively, as shown in FIG. 17, by forcing the axle rolling bearing 1 to slip out of the knuckle 23 toward the vehicle inner side A, the anti-slip member 52 may be disconnected from the inclined engagement sections 54.

Figure 18:
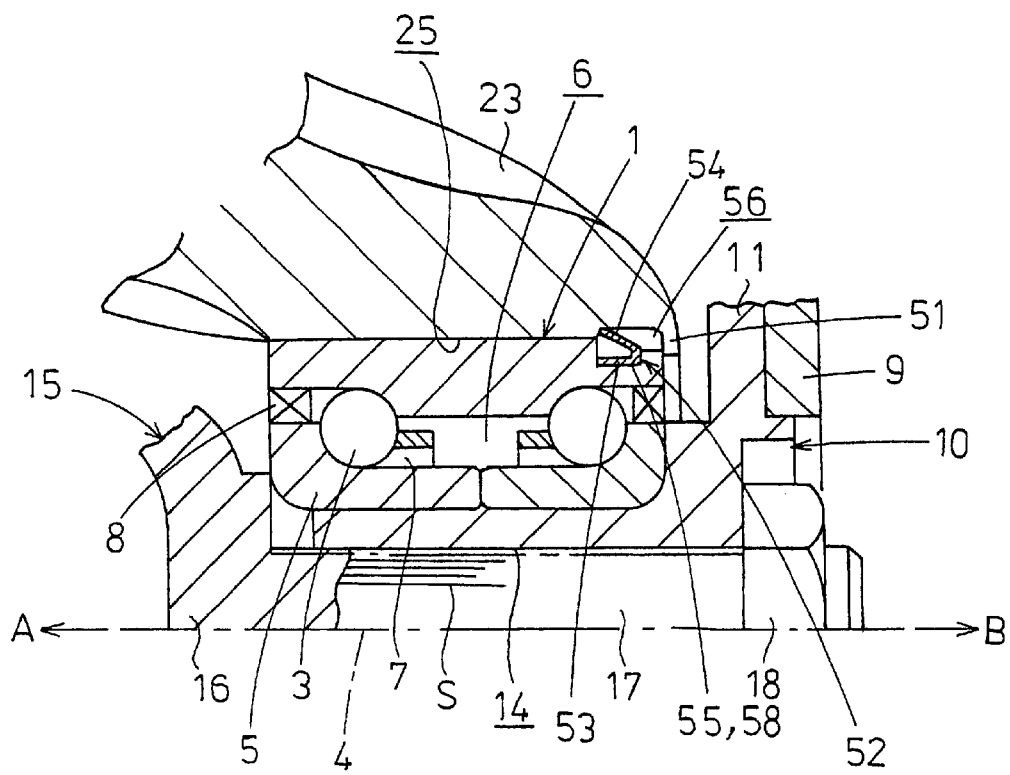
FIG. 18 is a longitudinal sectional view of a mounting structure according to still another preferred embodiment of the present invention.
Figure 19:
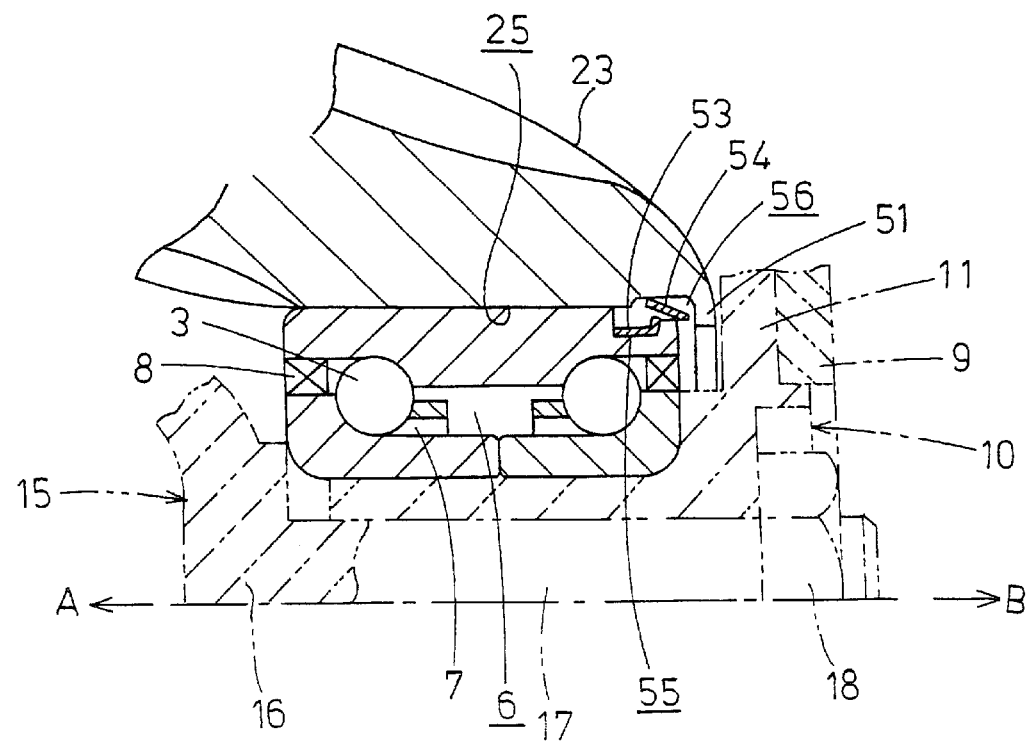
FIG. 19 is a longitudinal sectional view showing a manner in which a rolling bearing is withdrawn from a knuckle.

A mounting structure according to another preferred embodiment will be described on the basis of FIGS. 18 and 19. The mounting structure in this embodiment includes an anti-slip piece 51 which is formed on the vehicle outer side B of a knuckle 23 so as to prevent an axle rolling bearing 1 from moving toward the vehicle outer side B. To prevent the axle rolling bearing 1 from moving toward a vehicle inner side A, this mounting structure also includes an engagement concave section 56 which is formed adjacent the anti-slip piece 51 and continuous to the insertion hole 25 of the knuckle 23, amounting concave section 55 which is formed at a position opposed to the engagement concave section 56 on the outer peripheral surface of an outer ring member 2 while the axle rolling bearing 1 is attached to the knuckle 23, and an anti-slip member 52 which is attached to the mounting concave section 55.

The anti-slip member 52 consists of an annular main body 53 which abuts on both sidewalls, serving as support members of the mounting concave section 55 and which is prevented from moving in the direction of an axial center 4, and inclined engagement sections 54 which are formed integrally with the main body 53 and inclined so as to enlarge a diameter toward the vehicle inner side A.

The main body 53 is formed annularly in the same way of the preceding embodiments. The main body 53 is cut off halfway along the direction of the axial center 4. By providing this cutoff section, the main body 55 is formed to be able to have a reduced or enlarged diameter. The plurality inclined engagement sections 54 are formed, at predetermined intervals, on the main body in the circumferential direction thereof.

The mounting concave section 55 also serves as a containing concave section 58 which contains the inclined engagement sections 54 when the inclined engagement sections 54 of the anti-slip member 52 are pressed by the vehicle inner side A outer peripheral surface of the outer ring member 2 and thereby elastically deformed while the axle rolling bearing 1 is being press-fitted into the insertion bore 25 of the knuckle 23 from the vehicle outer side B. Since the remaining constituent components are the same as those in the preceding embodiments, they are indicated by the same reference numerals, respectively and will not be described herein.

With the above-stated configuration, if the axle rolling bearing (or a hub unit) 1 is inserted into the insertion bore 25 of the knuckle 23 from the vehicle outer side B while the anti-slip member 52 is attached to the mounting concave section 55, the inclined engagement sections 54 are pressed to the inner peripheral surface of the knuckle 23 and contained in the containing concave section 58. While the axle rolling bearing 1 is being compressed, the inclined engagement sections 54 slide on the inner peripheral surface of the knuckle 23. And when the end portion of the axle rolling bearing 1 abuts on the anti-slip piece 51, the inclined engagement sections 54 enters the engagement concave section 56 by their elastic forces. As a result, the outside surfaces of the inclined engagement sections 54 are engaged with the engagement surface 57 of the engagement concave section 56. Therefore, the axle rolling bearing 1 is prevented from moving toward the direction of the axial center 4.

Thereafter, a hub wheel 10 is press-fitted into the inner ring member 5 of the axle rolling bearing 1 from the vehicle outer side A, a brake disc rotor 9 is mounted to a hub flange 11 and the axial section 17 of a uniform joint 15 is spline S-fitted into the central bore 14 of the hub wheel 10 from the vehicle inner side A and a nut 18 is fastened to the end portion of the axial section 17. As a result, the knuckle 23, the axle rolling bearing 1, the hub wheel 10 and the brake disc rotor 9 are integrated with one another.

If the axle rolling bearing 1 is withdrawn from the knuckle 23, the nut 18 is loosened to detach the axial section 17 of the uniform joint 15 and the hub wheel 10 is forced to be detached toward the vehicle outer side B. Thereafter, as shown in FIG. 19, the axle rolling bearing 1 is forced to pull out of the knuckle 23 toward the vehicle inner side A against the engagement force engaging the outside surfaces of the inclined engagement sections 54 with the engagement surface 57 of the engagement concave section 56 to disconnect the inclined engagement sections 54 from the main body 53, thereby withdrawing the axle rolling bearing 1 from the knuckle 23. In addition, by forming a fragile section in a continuous section in which the inclined engagement sections 54 are continuous to the main body 53, the axle rolling bearing 1 may be forced to be withdrawn from the knuckle 23 by a predetermined force by detaching forcedly.

Figure 20:
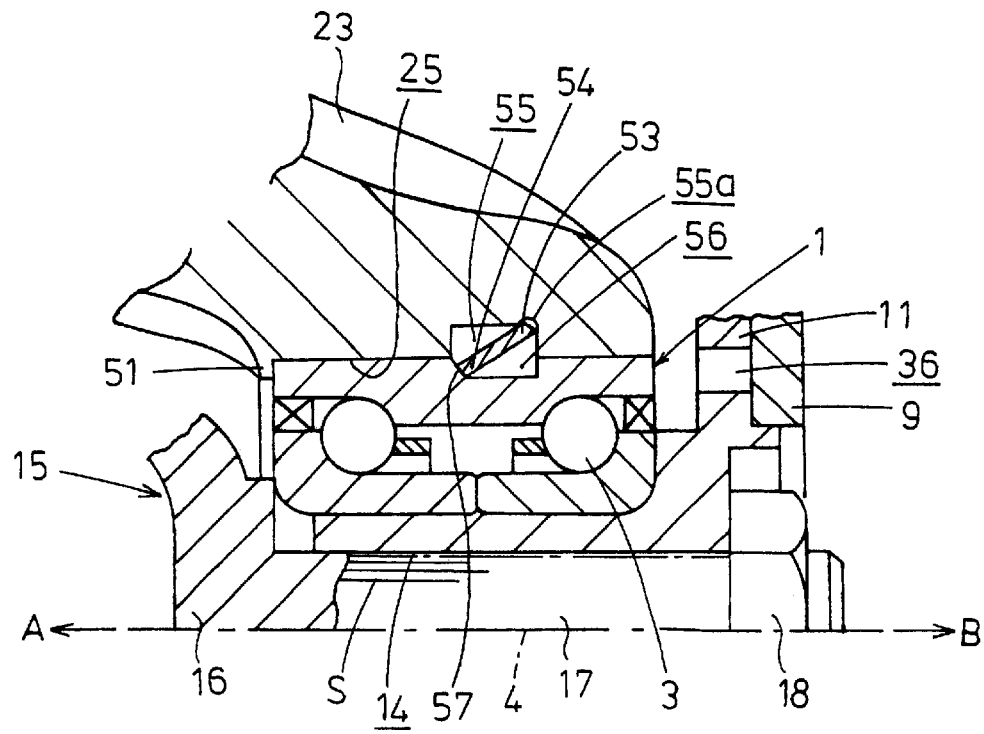
FIG. 20 is a longitudinal sectional view of a mounting structure according to still another preferred embodiment of the present invention.
Figure 21:
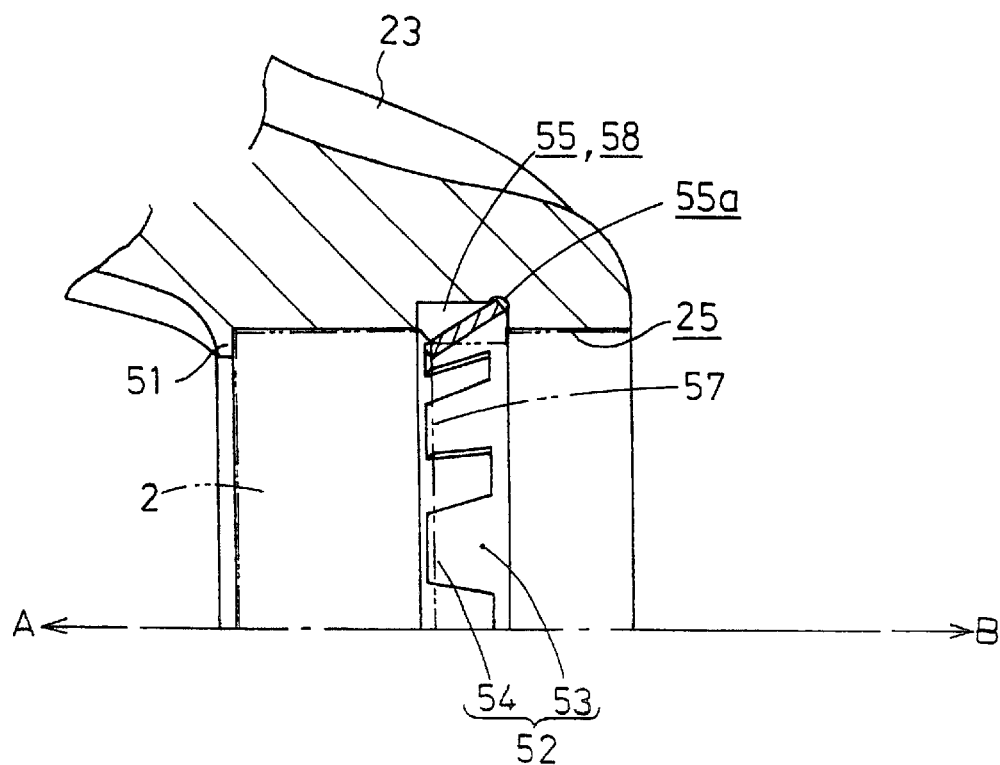
FIG. 21 is a longitudinal sectional view showing a state in which an anti-slip member is attached to a mounting concave section.

Next, a mounting structure according to another preferred embodiment will be described on the basis of FIGS. 20 and 21. The mounting structure in this embodiment includes an anti-slip piece 51 which is formed on a knuckle 23 so as to prevent an axle rolling bearing 1 from moving toward a vehicle inner side A (one side in the direction of an axial center 4). To prevent the axle rolling bearing 1 from moving toward a vehicle outer side B, the mounting structure also includes a mounting concave section 55 which is formed halfway along the inner peripheral surface of the insertion bore 25 of the knuckle 23, an engagement concave section 56 which is formed at a position opposed to the mounting concave section 55 on the outer peripheral surface of an outer ring member 2 while the axle rolling bearing 1 is attached to the knuckle 23, and an anti-slip member 52. This anti-slip member 52 is formed into crown shape out of an annular main body 53 which is formed to have a reduced diameter toward the vehicle inner side A and inclined engagement sections 54 which are formed on the extension of the main body 53, equal in inclination to the main body 53 and formed at intervals of predetermined angles in a circumferential direction.

The main body 53 is attached to an annular groove 55a which is formed in the vehicle outer side B corner of the mounting concave section 55, and the engagement surface 57 of the engagement concave section 56 is an inclined surface having an enlarged diameter toward the vehicle inner side A.

The main body 53 is formed annularly in the same way of the preceding embodiment and cut off halfway along the direction of the axial center 4. By providing this cutoff section, the main body 53 is formed to be able to have a reduced or enlarged diameter.

In addition, the mounting concave section 55 also serves as a containing concave section 58 which contains the inclined engagement sections 54 when the inclined engagement sections 54 of the anti-slip member 52 are pressed by the vehicle inner side A outer peripheral surface of the outer ring member 2 and thereby elastically deformed while the axle rolling bearing 1 is being press-fitted into the insertion bore 25 of the knuckle 23 from the vehicle outer side B. Since the remaining constituent components are the same as those in the above-mentioned first embodiment, they are indicated by the same reference numerals, respectively and will not be described herein.

With the above-stated configuration, if the axle rolling bearing 1 (or hub unit) is inserted into the insertion bore 25 of the knuckle 23 as in the case of the preceding embodiments, the inclined engagement sections 54 are pressed to the outer peripheral surface of the outer ring 2 and contained in the containing concave section 58. While the axle rolling bearing 1 is being forced into the insertion bore 25, the inclined engagement sections 54 slide on the outer peripheral surface of the outer ring member 2. When the end portion of the axle rolling bearing 1 abuts on the anti-slip piece 51, the inclined engagement sections 54 enter the engagement concave section 56 by their elastic forces and the outside surfaces of the inclined engagement sections 54 are engaged with the engagement surface 57 of the engagement concave section 56.

Therefore, the axle rolling bearing 1 is prevented from moving toward vehicle outer side B. Thereafter, the axial section 17 of a uniform joint 15 is spline S-fitted into the insertion bore 25 of a hub wheel 10 and fastened by a nut 18.

If the axle rolling bearing 1 is withdrawn from the knuckle 23, the nut 18 is loosened to detach the axial section 17 of the uniform joint 15 and the axle rolling bearing 1 is forced to pull out against the engagement force engaging the outside surfaces of the inclined engagement sections 54 with the engagement surface 57 of the engagement concave section 56. If so, the outside surfaces of the inclined engagement sections 54 are pushed up along the engagement surface 57 of the engagement concave section 56, and the inclined engagement sections 54 are contained in the containing concave section 58. While the axle rolling bearing 1 is being pulled out, the inclined engagement sections 54 slide on the outer peripheral surface of the outer ring member 2. Alternatively, by forming a fragile section in a continuous section in which the inclined engagement sections 54 are continuous to the main body 53, the fragile section may be forced to be cut off by a predetermined force to thereby withdraw the axle rolling bearing 1 from the knuckle 23.

Figure 22:
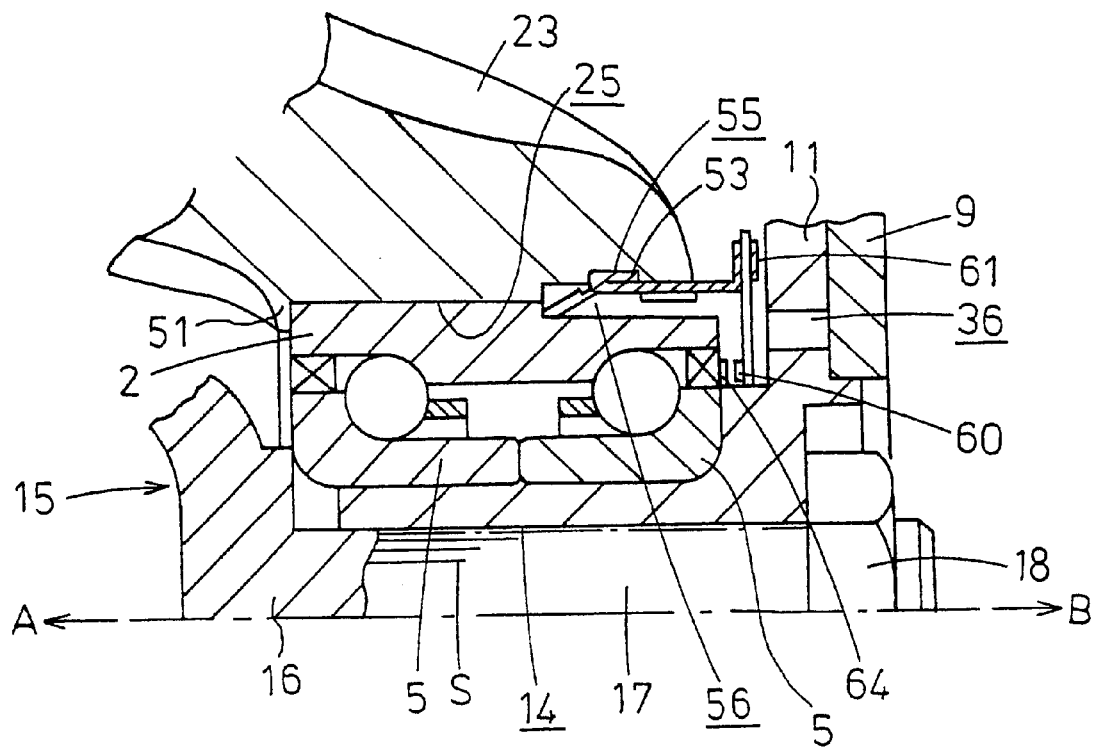
FIG. 22 is a longitudinal sectional view of a mounting structure according to still another preferred embodiment of the present invention.
Figure 23:
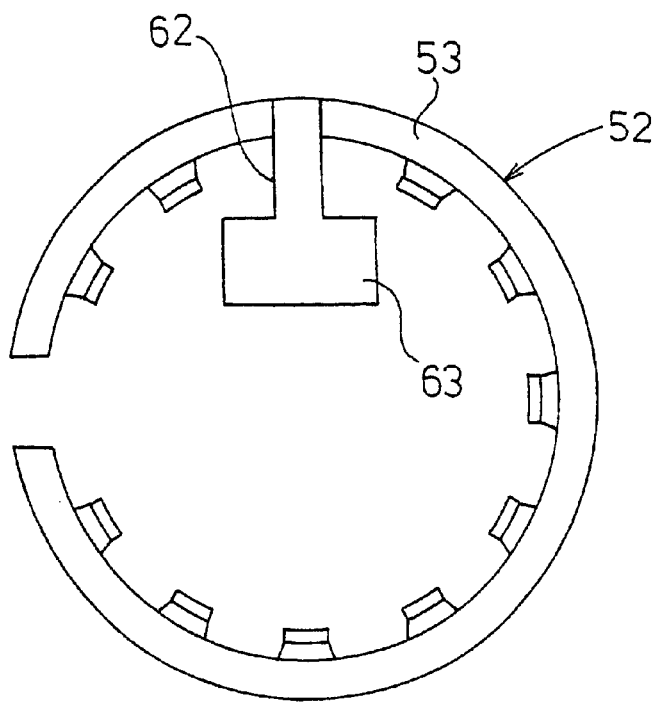
FIG. 23 is a front view showing a state in which an anti-slip member in the mounting structure shown in FIG. 22 is being manufactured.
Figure 24:
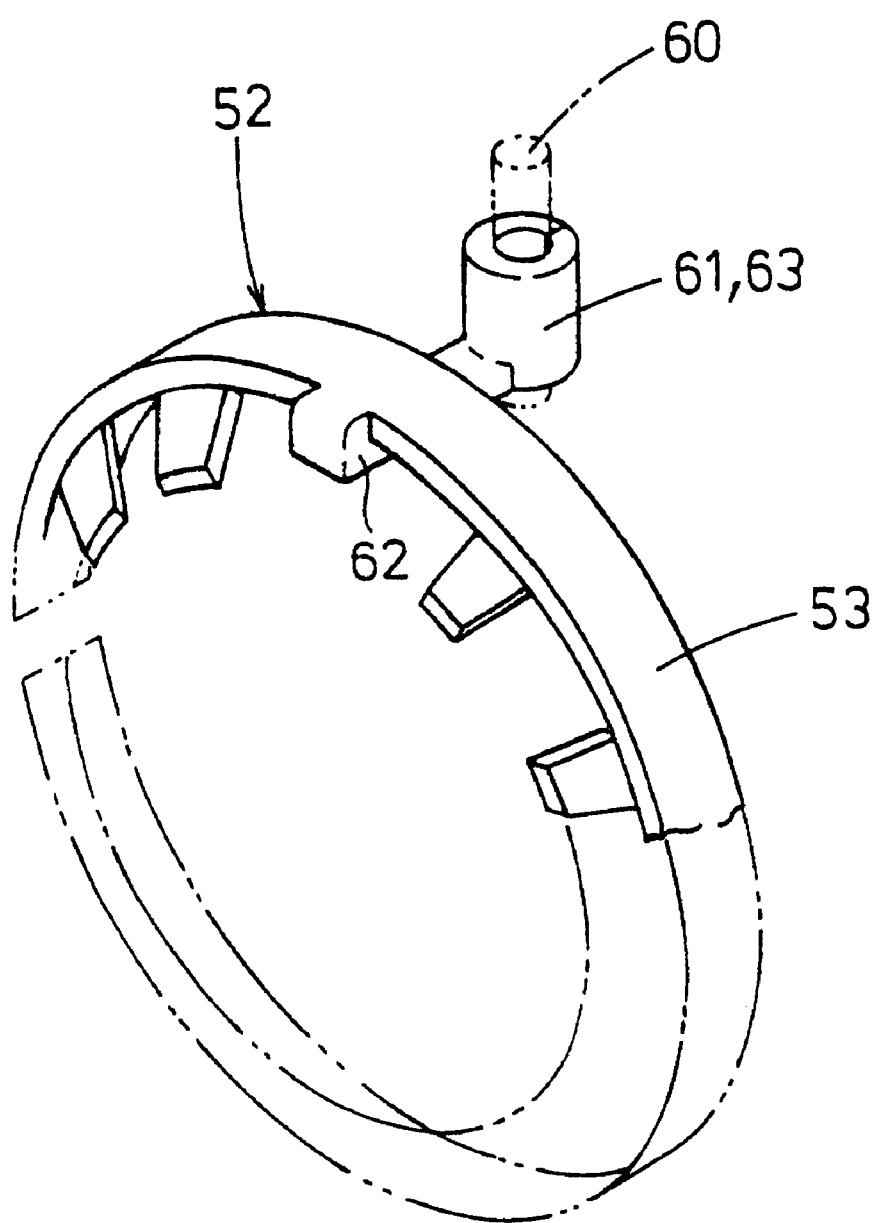
FIG. 24 is a perspective view showing only the anti-slip member shown in FIG. 23.
Figure 26:
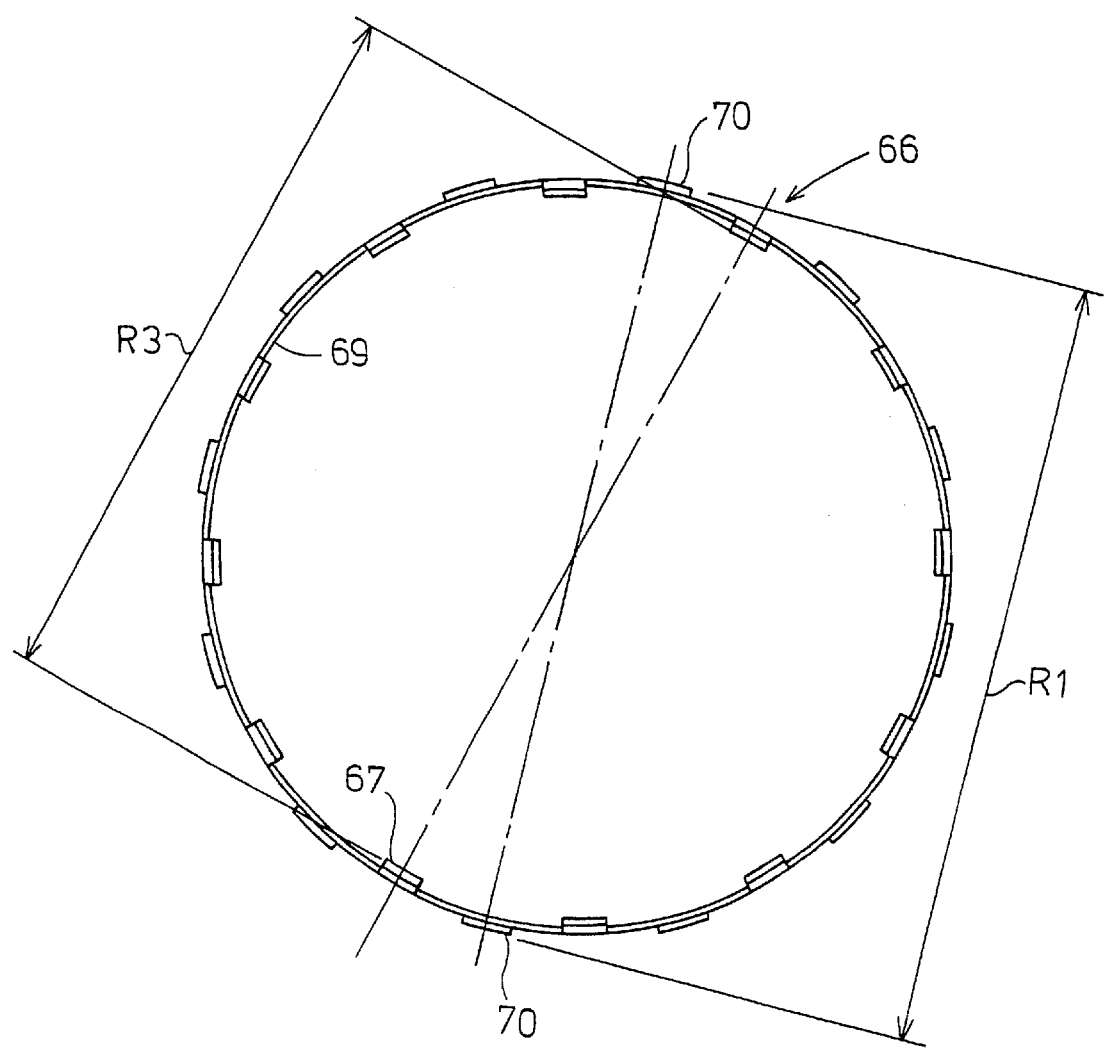
FIG. 26 is a front view of the anti-slip member as a complete component.
Figure 27:
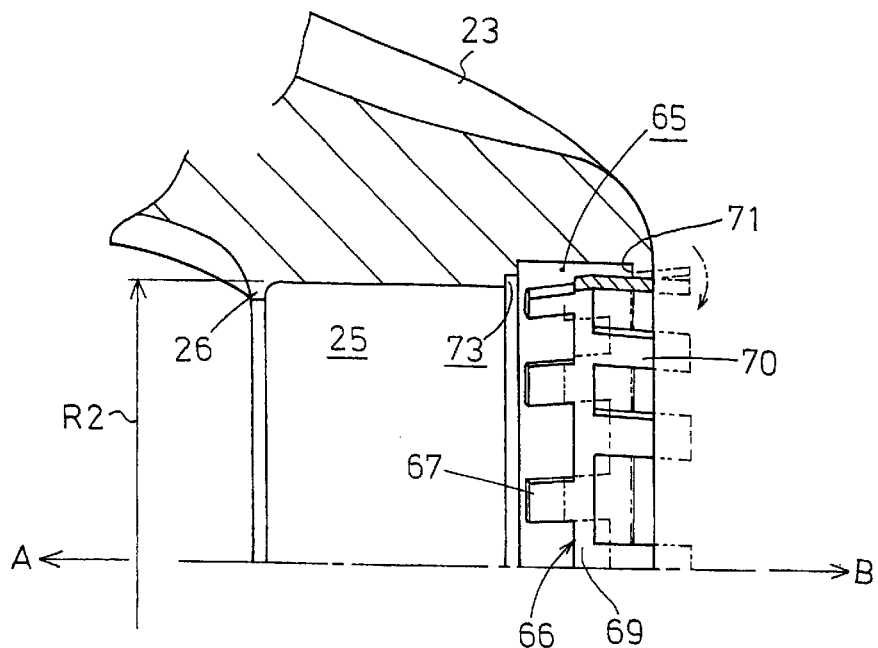
FIG. 27 is a longitudinal sectional view showing a state in which the anti-slip member shown in FIG. 26 is being attached to a knuckle.
Figure 28:
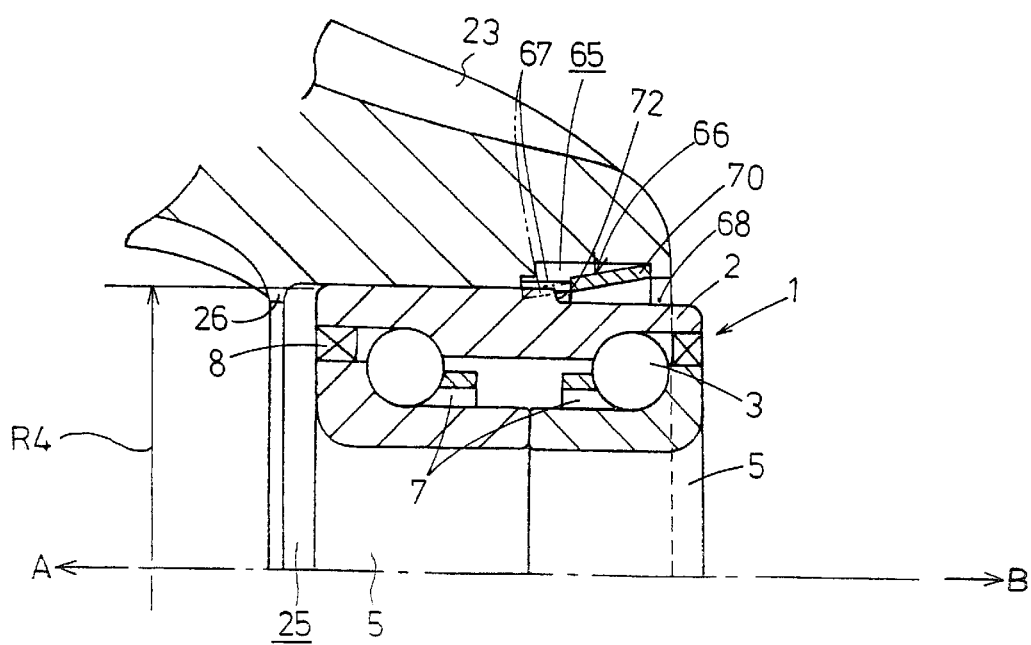
FIG. 28 a longitudinal sectional view showing a state in which an axle rolling bearing is being attached to the knuckle.
Figure 29:
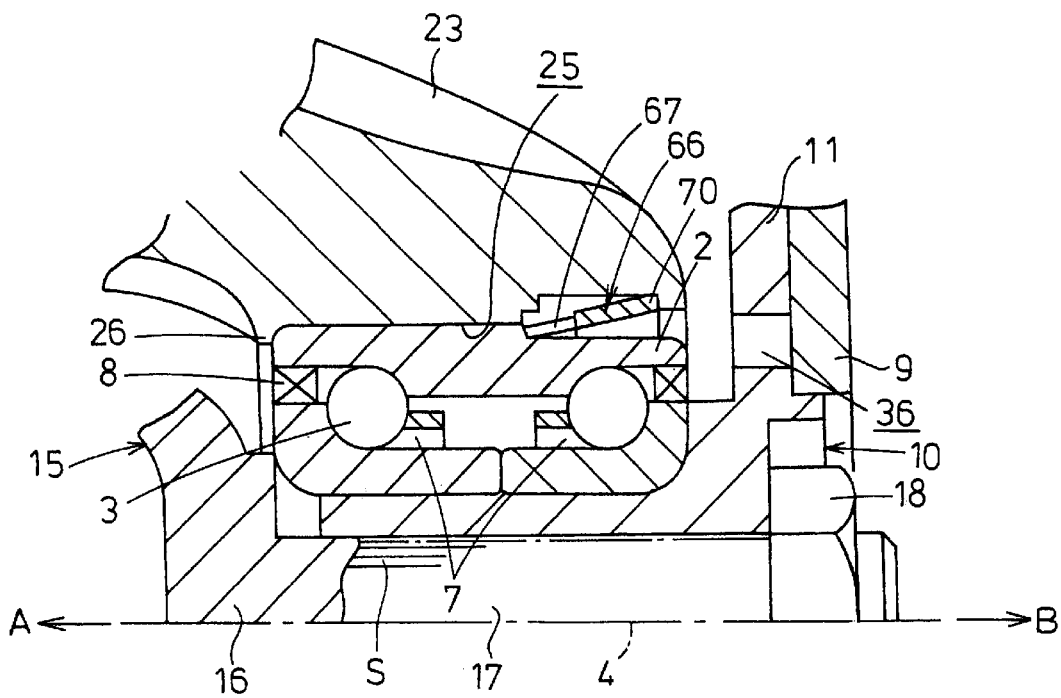
FIG. 29 is a longitudinal sectional view showing a state of use in which the axle rolling bearing has been attached to the knuckle.

FIGS. 22 to 24 show another embodiment of an anti-slip member 52. This anti-slip member 52 has a peculiar function. That is, the anti-slip member 52 in the present embodiment is such that a support 61 for supporting a vehicle speed sensor 60 is formed integrally with the anti-slip member 52 shown in FIGS. 7, 11, 13 and the like.

In the examples shown in drawings, the anti-slip member 52 is formed by bending the neck section 62 of the support 61 from the main body 53 and rounding a grip section 63, i.e., a section to which the vehicle speed sensor 60 is mounted.

Moreover, in the drawings, an anti-slip piece 51 is formed on the vehicle inner side A of a knuckle 23. A mounting concave section 55 is formed on the vehicle outer side B of the insertion bore 25 of the knuckle 23, and an engagement concave section 56 is formed on the vehicle outer side B outside surface of an outer ring 2 so as to reduce the diameter of the outer ring member 2. Further, an annular mounting angle (e.g., a metal ring of a package seal) is fixed to an inner ring member 5, a pulsar ring 64 is provided at a position of the mounting angle opposed to the detection section of the vehicle speed sensor 60. It is noted that the shapes of the remaining constituent components except the support 61 of the anti-slip member 52 are the same as those shown in FIGS. 7, 8 and 11.

In each of the preceding embodiments, the attachment member is cut off halfway along the circumferential direction so that the diameter thereof can be freely reduced or enlarged. It is considered that, in such a configuration, the rigidity is lower than that of a configuration in which the attachment member is formed annularly without providing any cutoff section, by as much as the provision of the cutoff section. Therefore, hereinafter, an embodiment in which the rigidity of the anti-slip member is improved from those in the preceding embodiment will next be explained.

In an embodiment shown in FIGS. 25 to 31, a mounting structure consists of an anti-slip piece 26 which is formed by reducing the diameter of the vehicle inner side A of the insertion bore 25 of a knuckle 23 inward in a diameter direction, an annular mounting concave section 65 which is formed along a peripheral direction toward a vehicle outer side B on the peripheral surface of the insertion bore 25, the anti-slip member 66 supported by the mounting concave section 65, and an engagement concave section 68 which is formed toward the vehicle outer side B on the outer peripheral surface of an outer ring member 2 and into which the stabilizing deformed section 67 of the anti-slip member 66 is inserted.

The anti-slip member 66 is formed by an annular main body 69, an attachment deformed section 70 and the stabilizing deformed section 67. The attachment deformed section 70 is formed integrally with the vehicle outer side B of the main body 69. The attachment deformed section 70 is pressed by the peripheral surface of the insertion bore 25 and the diameter thereof is reduced when the anti-slip member 66 is inserted into the insertion bore 25 from the outer side B. The diameter of the attachment deformed section 70 is enlarged in case of being attached to the mounting concave section 65. The attachment deformed section 70 is provided to engage the mounting concave section 65 and the insertion bore 25 with a continuous, outer-side engagement surface 71 with a step.

The stabilization deformed section 67 is formed integrally with the vehicle inner side A of the main body 69. If an axle rolling bearing 1 is inserted into the insertion bore 25 from the outer side B after the anti-slip member 66 is attached to the mounting concave section 65, the stabilizing deformed section 67 is pressed by the outer peripheral surface of the outer ring member 2 of the axle rolling bearing 1 and the diameter thereof is enlarged against an elastic force. Thereafter, the diameter of the stabilizing deformed section 67 is reduced by the elastic force so that the stabilizing deformed section 67 enters the engagement concave section 68 formed at a position opposed to the mounting concave section 65 in the diameter direction on the outer peripheral surface of the outer ring 2 and engaged with an inner-side engagement surface 72 formed on the engagement concave section 68.

In the anti-slip member 66, the attachment deformed section 70 and the stabilizing deformed section 67 are formed at predetermined intervals in the circumferential direction to thereby form into gear shape. The attachment deformed section 70 and the stabilizing deformed section 67 are formed so that the base sections thereof on the main body 69 side are plasticity toward the main body 69.

The attachment deformed section 70 and the stabilizing deformed section 67 are formed so that the diameters thereof are sequentially reduced from the attachment deformed section 70 to the stabilizing deformed section 67. The maximum diameter R1 of the attachment deformed section 70 is set larger than the diameter R2 of the inner side A of insertion bore 25. The minimum diameter R3 of the stabilizing deformed section 67 is set smaller than the outer peripheral diameter R4 of the outer ring member 2 (almost equal to the diameter R2 of the insertion bore 25). As a result, it is possible that the attachment deformed section 70 enters the mounting concave section 65 and can be engaged with the outer-side engagement surface 71 thereof. The stabilizing deformed section 67 enters the engagement concave section 68 and can be engaged with the inner-side engagement surface 72 with a step continuous to the outer peripheral surface of the outer ring member 2.

A permission concave section 73 which permits the deformation of the stabilizing deformed section 67 which enlarge the diameter thereof when the axle rolling bearing 1 is inserted into the insertion bore 25 from the outer side B is formed to be continuous to the vehicle inner side A of the mounting concave section 65. This permission concave section 73 is formed to be smaller in diameter than the mounting concave section 65.

The diameter of the outer side B end portion of the insertion bore 25 of the knuckle 23 is set smaller than that of the mounting concave section 65 and larger than the diameter R2 of the inner side A of the insertion bore 25. The width of the overall mounting concave section 65 including the permission concave section 73 in the direction of an axial center 4 is set almost equal to that of the overall entire anti-slip member 66. Since the constituent components of the axle rolling bearing 1 are the same as those in the preceding embodiments, they are indicated by the same reference numerals, respectively and will not be described herein.

Procedures for attaching the axle rolling bearing 1 to the knuckle 23 will next be described. First, the anti-slip member 66 is inserted from the stabilizing deformed section 67 side into the insertion bore 25, and the anti-slip member 66 is attached to the mounting concave section 65 formed on the knuckle 23 in advance.

At this moment, by setting the minimum diameter R3 of the stabilizing deformed section 67 to be smaller than the diameter R2 of the insertion bore 25 (the diameter of the vehicle outer side B end portion), the anti-slip member 66 can be easily inserted into the insertion bore 25, but the maximum diameter R1 of the attachment deformed section 70 is set larger than the diameter R2 of the insertion bore 25.

However, the attachment deformed section 70 is formed to be bent toward the main body 69 and formed into gear shape. Therefore, if the anti-slip member 66 is pressed toward the inner side A, the attachment deformed section 70 is pressed by the peripheral surface of the outer side B end portion of the insertion bore 25 of the knuckle 23 and the diameter thereof is reduced. As a result, by pressing the anti-slip member 66 against the elastic force of the attachment deformed section 70, the anti-slip member 66 can be inserted into the knuckle 23.

By further pressing the anti-slip member 66 toward the vehicle inner side A, the anti-slip member 66 enters the mounting concave section 65 and is restored to its original shape so as to enlarge the diameter of the attachment deformed section 70 of the anti-slip member 66, the end portion thereof is engaged with the vehicle outer-side engagement surface 71 of the mounting concave section 65 and the anti-slip member 66 is then attached to the mounting concave section 65.

After attaching the anti-slip member 66 to the mounting concave section 65 in this way, the axle rolling bearing 1 is inserted into the insertion bore 25 of the knuckle 23. In this case, the insertion is conducted using a press-fit tool 35 as in the case of the embodiment shown in FIG. 5.

The minimum diameter R3 of the stabilizing deformed section 67 of the anti-slip member 66 is set smaller than the outer peripheral diameter R4 of the outer ring member 2. However, the stabilizing deformed section 67 is formed to be bent toward the main body 69. Therefore, if the axle rolling bearing 1 is inserted into the insertion bore 25 of the knuckle 23 from the outer side B toward the inner side A with the outer ring member 2 thereof being pressed, then the stabilizing deformed section 67 is pressed by the outer peripheral surface of the outer ring member 22 of the axle rolling bearing 1 and the diameter thereof is enlarged. In a state in which the diameter is enlarged, the stabilizing deformed section 67 evades from the outer inner ring member 2 so as to enter the permission concave section 73. Due to this, by pressing the axle rolling bearing 1 against the elastic force of the stabilizing deformed section 67, the axle rolling bearing 1 can be inserted into the insertion bore 25.

The stabilizing deformed section 67 of the anti-slip member 62 enters the engagement concave section 68 at a position at which the outer ring member 2 of the axle rolling bearing 1 abuts on the anti-slip piece 26 formed on one side of the knuckle 23 and the end portion of the deformed section 67 is engaged with the vehicle inner-side engagement surface 72.

In a state in which the axle rolling bearing 1 has been attached to the insertion bore 25 of the knuckle 23 as described above, it is ensured that the axle rolling bearing 1 is prevented from slipping out of the knuckle 23 toward the vehicle inner side A by the anti-slip piece 26. The stabilizing deformed section 67 of the anti-slip member 66 is engaged with the vehicle inner-side engagement surface 72 of the engagement concave section 68 and the attachment deformed section 70 of the anti-slip member 66 is engaged with the vehicle outer-side engagement surface 71 of the mounting concave section 65, thereby ensuring that the axle rolling bearing 1 is prevented from slipping out of the knuckle 23 toward the vehicle outer side B.

As described above, the minimum diameter R3 of the stabilizing deformed section 67 of the anti-slip member 66 is set smaller than the diameter R2 of the insertion bore 25. The attachment deformed section 70 is formed to be bent toward the main body 69 and formed into gear shape, thereby making it possible to form the anti-slip member 66 annularly without providing a partial cutoff section for reducing the diameter. As a result, high rigidity is ensured in the state that the axle rolling bearing 1 is attached to the knuckle 23 compared with the anti-slip member provided with the partial cutoff section and it is possible to ensure to prevent the axle rolling bearing 1 from slipping out.

Furthermore, as in the case of the preceding embodiments, it is possible to reduce the size of the knuckle and thereby improve the degree of freedom of design.

After attaching the axle rolling bearing 1 to the knuckle 23 as mentioned-above, the barrel section of the hub wheel 10 is press-fitted into the central bore of the inner ring member 5 from the vehicle outer side B and then the axial section 17 of the bowl-shaped outer ring member 16 is press-fitted into the central bore of the hub wheel 10 from the vehicle inner side A through a spline S, thereby engaging the end portion of the axial section 17 with a nut member 18.

Figure 30:
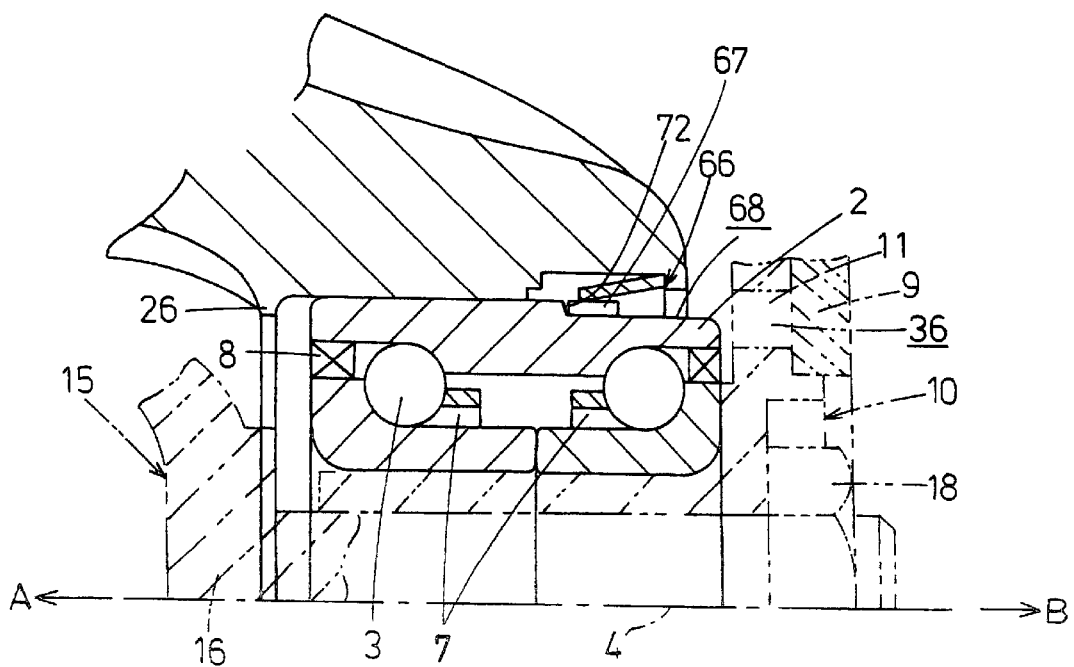
FIG. 30 is a longitudinal sectional view showing a state in which the axle rolling bearing is withdrawn from the knuckle.
Figure 32:
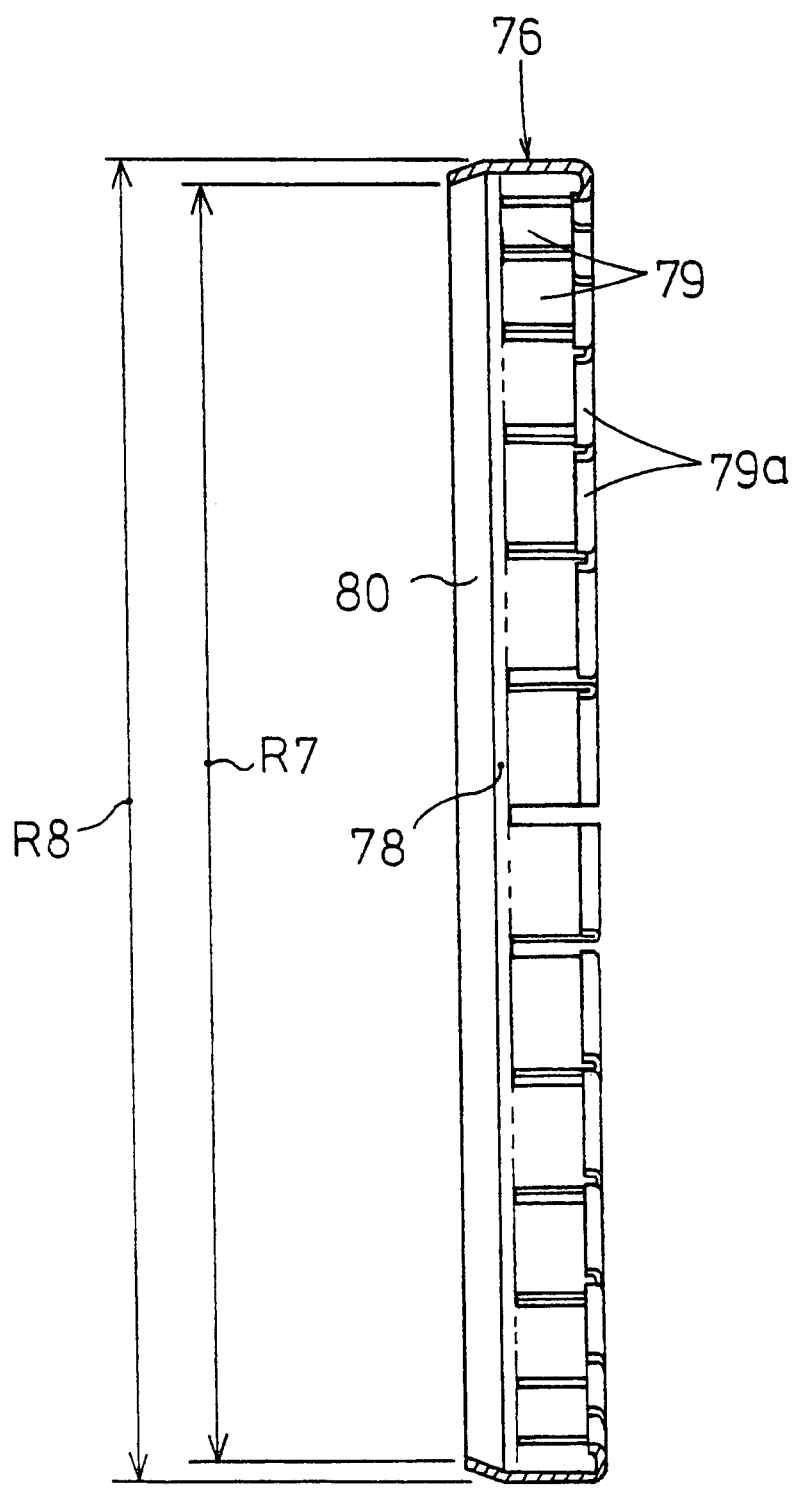
FIG. 32 is a longitudinal sectional view of an anti-slip member according to another preferred embodiment of the present invention.
Figure 33:
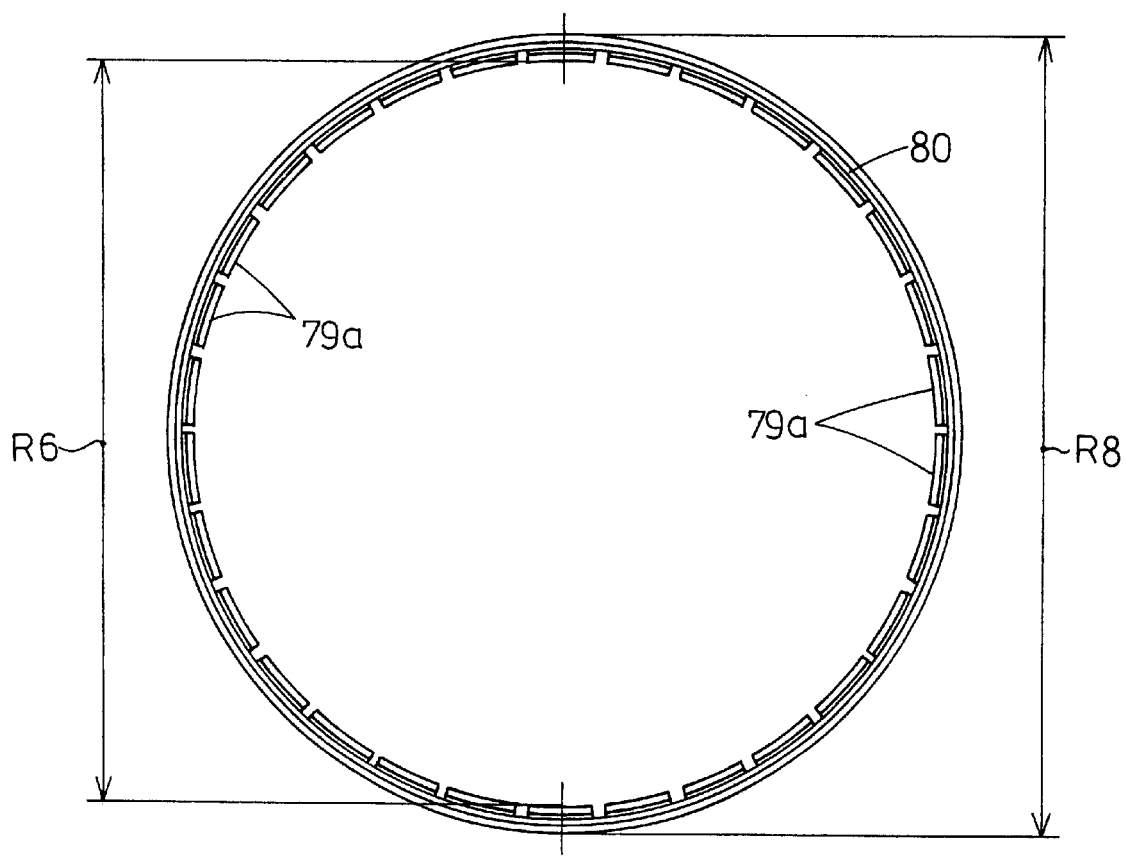
FIG. 33 is a front view of the anti-slip member shown in FIG. 32.

On the other hand, if the axle rolling bearing 1 is to be withdrawn from the knuckle 23 for maintenance or the like, the opposite operation to that stated above is performed. That is, the nut member 18 is detached from the axial section 17, the bowl-shaped outer ring member 16 is pulled out toward the vehicle inner side A, the hub wheel 10 is pulled out from the axle rolling bearing 1 toward the vehicle outer side B, and then the axle rolling bearing 1 is withdrawn from the knuckle 23. At this moment, load is applied to the axle rolling bearing 1 so as to pull out the axle rolling bearing 1 from the knuckle 23 toward the vehicle outer side B against the elastic force (rigidity) of the anti-slip member 66. As a result, as shown in FIG. 30, the stabilizing deformed section 67 of the anti-slip member 66, for example, is disconnected from the main body 69, making it possible to withdraw the axle rolling bearing 1 from the knuckle 23.

Alternatively, as shown in FIG. 31, the axle rolling bearing 1 can be withdrawn from the knuckle 23 using a predetermined tool, i.e., a release ring 50. That is, the release ring 50 is inserted into the press-fit bore 36 to thereby abut on the attachment deformed section 70. Using a predetermined tool, the release ring 50 is further forced into the press-fit bore 36, thereby deforming the attachment deformed section 70 so as to allow the section 70 to enter the permission concave section 73 and disengaging the end portion of the stabilizing deformed section 67 from the vehicle inner-side engagement surface 72.

While maintaining this state, the axle rolling bearing 1 can be pulled out from and thereby withdrawn from the knuckle 23. By doing so, the anti-slip member 66 is not broken when the axle rolling bearing 1 is withdrawn from the knuckle 23, it is possible to recycle the anti-slip member 66. Besides, the axle rolling bearing 1 can be withdrawn with a lower force than that required when the axle rolling bearing 1 is withdrawn by disconnecting the attachment deformed section 70 of the anti-slip member 66 from the main body 69.

FIGS. 32 to 37 show another preferred embodiments. The mounting structure in this embodiment consists of an anti-slip piece 26 which is formed on a vehicle inner side A of the insertion bore 25 of a knuckle 23, an annular mounting concave section 75 which is formed at the vehicle outer side B position of the insertion bore 25 along a peripheral direction, an anti-slip member 76 which is supported by the mounting concave section 75, and an engagement concave section 77 which is formed on the outer peripheral surface of the vehicle outer side A of an outer ring member 2.

The anti-slip member 76 is formed integrally out of an annular, narrow main body 78, an attachment deformed section 79 of an L-shaped cross section which is provided into gear shape, a stabilizing deformed section 79a which is bent from the end portion of the inside diameter of the attachment deformed section 79 toward one side, and a supporting bent section 80 which is provided on the other side of the main body 78.

The supporting bent section 80 is formed to be inclined so that the diameter thereof is sequentially reduced from the main body 78 side toward the vehicle inner side A. The minimum diameter R7 of the supporting bent section 80 is set almost equal to the diameter R2 of the insertion bore 25 and the maximum diameter R8 thereof is set larger than the diameter R2 of the insertion bore 25. This supporting bent section 80 is formed integrally with the main body 78 while being appropriately bent toward the main body 78. The maximum diameter of the attachment deformed section 79 is set equal to the maximum diameter R8 of the supporting bent section 80 and the end portion of the attachment deformed section 79 along the diameter direction thereof is bendable.

The inside diameter R6 of the stabilizing deformed section 79a is set smaller than the outer peripheral diameter R4 of the outer ring member 2 of the axle rolling bearing 1. Since the end portion of the attachment bent section 79 is bendable, the diameter of the stabilizing deformed section 79a can be enlarged.

The diameter of the vehicle outer side B end portion of the insertion bore 25 of the knuckle 23 is set smaller than the diameter of the mounting concave section 75 and larger than the diameter R2 of the insertion bore 25 on the vehicle inner side A. Since the other constituent components of the anti-slip member are the same as those in the preceding embodiments, they are denoted by the same reference numerals and will not be described herein.

Figure 34:
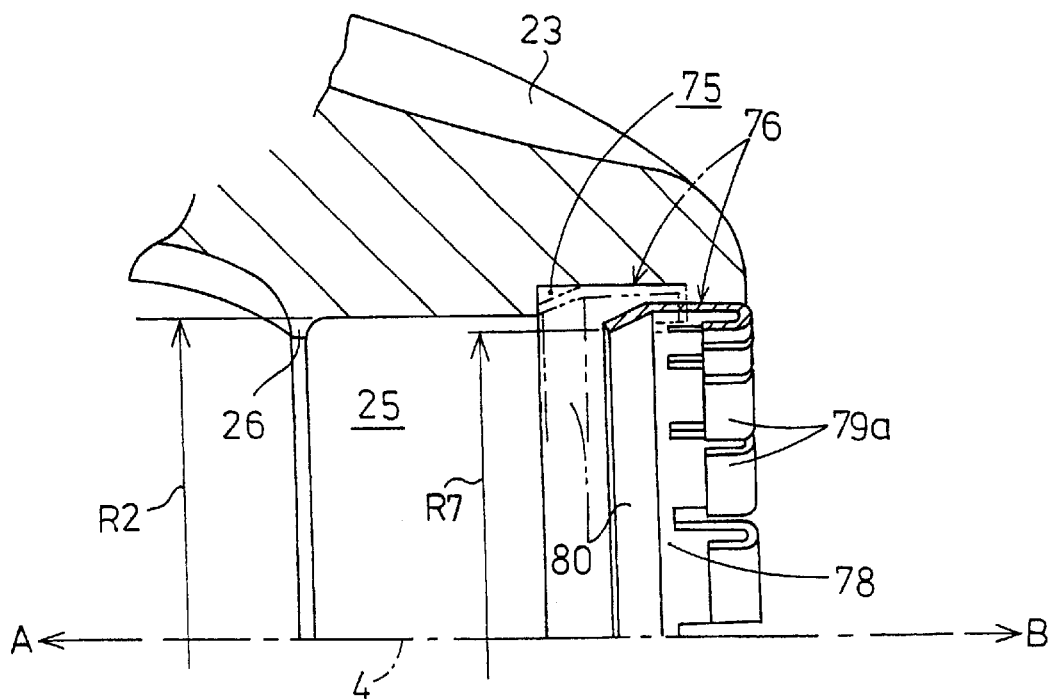
FIG. 34 is a longitudinal sectional view showing a state in which the anti-slip member shown in FIG. 33 is being attached to a knuckle.

Procedures for attaching the rolling bearing 1 to the knuckle 23 with the above-stated configuration will be described. First, as shown in FIG. 34, the anti-slip member 76 is inserted from the supporting bent section 80 side into the insertion bore 25 and the anti-slip member 76 is attached to the mounting concave section 75 which is formed on the peripheral surface of the insertion bore 25 of the knuckle 23 in advance.

At this moment, since the minimum diameter R7 of the supporting bent section 80 is set almost equal to the diameter R2 of the insertion bore 25, the anti-slip member 76 is easily inserted from the vehicle outer side B of the insertion bore 25. The maximum diameter of the attachment deformed section 79 is set equal to the maximum diameter R8 of the supporting bent section 80 and set larger than the diameter R2 of the insertion bore 25 (the diameter of the vehicle outer side B end portion).

However, the main body 78 formed integrally with the supporting bent section 80 is formed annularly and narrowly, so that the anti-slip member 76 is deformed and enters the insertion bore 25 by forcing the supporting bent section 80 to be pressed into the insertion bore 25 from the vehicle outer side B. By further pressing, the supporting bent section 80 is bent toward the main body 78 to reduce the diameter thereof so that the anti-slip member 76 can be inserted into the insertion bore 25. In addition, in case of that the anti-slip member 76 is attached to the mounting concave section 75, the diameter of the overall anti-slip member 76 is slightly enlarged. At this moment, the end portion of the supporting bent section 80 is engaged with the vehicle inner-side engagement surface 75a of the mounting concave section 75 and the end portion of the attachment deformed section 79 is engaged with the vehicle outer-side engagement surface 75b of the mounting concave section 75, thereby preventing the anti-slip member 76 from moving in the direction of the axial center 4.

After attaching the anti-slip member 76 to the mounting concave section 75, the axle rolling bearing 1 is attached to the insertion bore 25 of the knuckle 25 using a press-fit tool 35 as in the same of the embodiment shown in FIG. 5.

Figure 35:
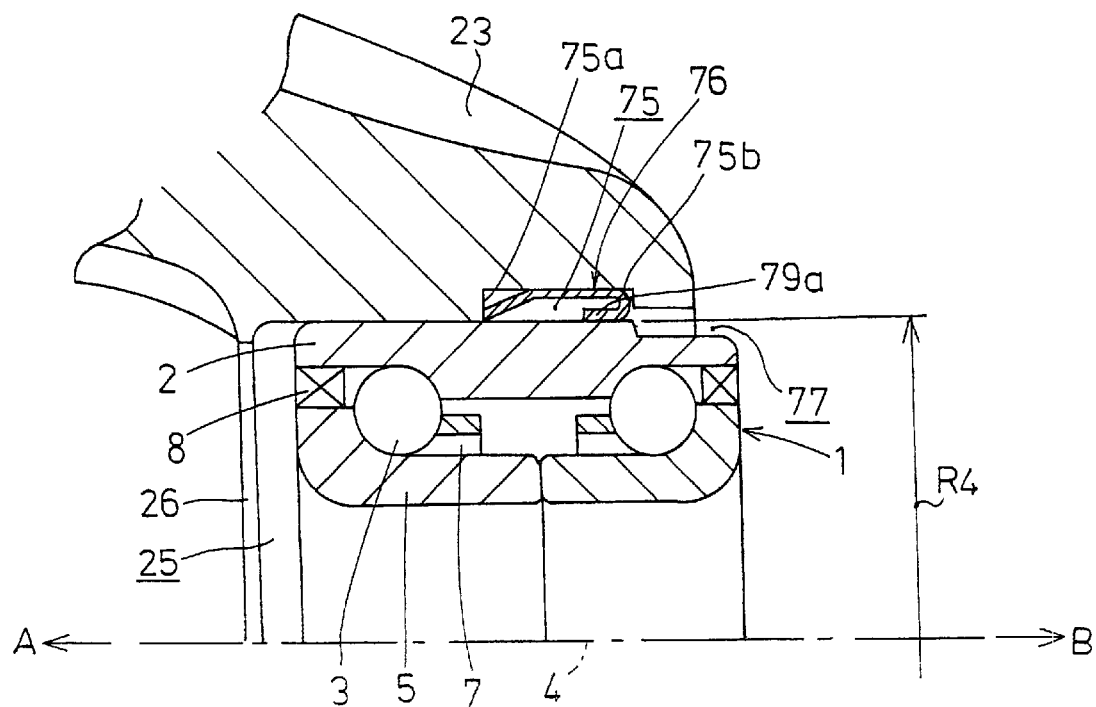
FIG. 35 is a longitudinal sectional view showing a state in which an axle rolling bearing is being attached to the knuckle.

The inside diameter R6 of the stabilizing bent section 79a is set smaller than the outer peripheral diameter R4 of the outer ring member 2 of the axle rolling bearing 1. However, if the stabilizing bent section 79a is pressed on the outer peripheral surface of the outer ring member 2 of the axle rolling bearing 1, the end portion of the attachment deformed section 79 is bent and the diameter of the stabilizing bent section 79a is enlarged as shown in FIG. 35. As a result, the axle rolling bearing 1 can be inserted into the insertion bore 25 of the knuckle 23.

Figure 36:
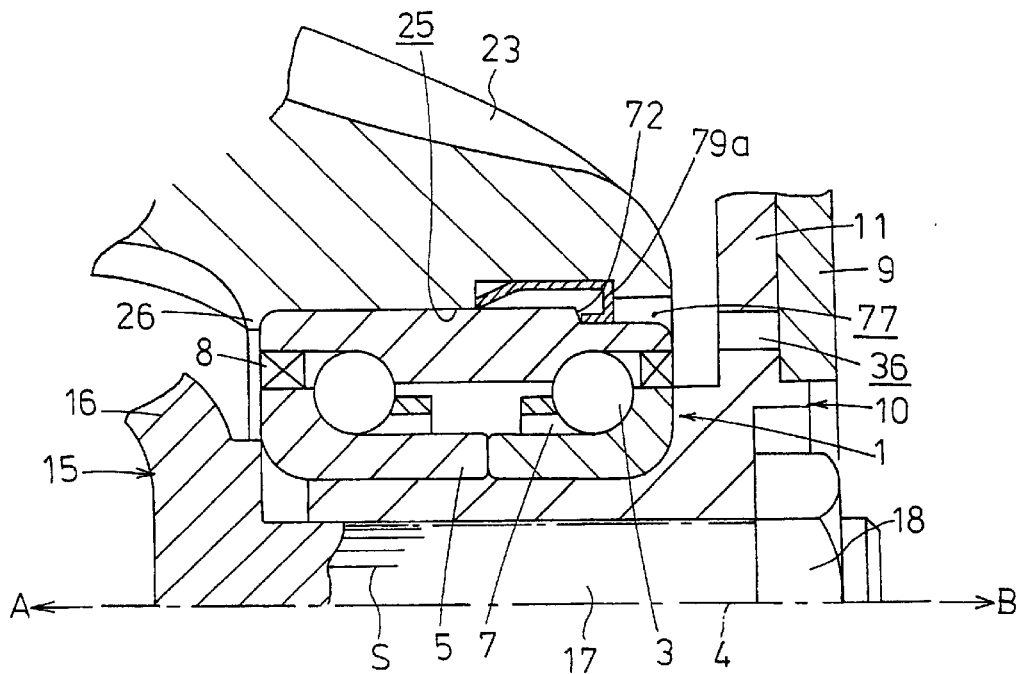
FIG. 36 is a longitudinal sectional view showing a state of use in which the axle rolling bearing has been attached to the knuckle and is being used.

Further, the axle rolling bearing 1 is inserted until the outer ring member 2 abuts on the anti-slip piece 26. When the engagement concave section 77 is opposed to the mounting concave section 75 in the diameter direction, the stabilizing deformed section 79a is restored to reduce the diameter thereof and the tip end portion thereof is engaged with the vehicle inner-side engagement surface 72 of the engagement concave section 77 as shown in FIG. 36.

Thus, it is ensured that the axle rolling bearing 1 is prevented from slipping out of the knuckle 23 toward the vehicle inner side A by the anti-slip piece 26. The end portion of the attachment deformed section 79 is engaged with the vehicle outer-side engagement surface 71 of the mounting concave section 75 and the tip end portion of the stabilizing deformed section 79a is engaged with the vehicle inner-side engagement surface 72 of the engagement concave section 77, thereby preventing the axle rolling bearing 1 from slipping out toward the vehicle outer side B.

As described above, the maximum diameter of the attachment deformed section 79 is set equal to the maximum diameter R8 of the supporting bent section 80 and larger than the diameter R2 of the insertion bore 25. However, since the main body 78 formed integrally with the supporting bent section 80 is formed annularly and narrowly, the anti-slip member 76 can be inserted into the insertion bore 25 by forcing and deforming the supporting bent section 80 into the insertion bore 25.

It is, therefore, possible to form the anti-slip member 76 annularly without providing a partial cutoff section for reducing the diameter. As a result, high rigidity is ensured while the axle rolling bearing 1 is attached to the knuckle 23, compared with the anti-slip member provided with the partial cutoff section, thereby it is possible to ensure preventing the axle rolling bearing 1 from slipping out.

Furthermore, it is possible dispense with a locating snap ring for preventing the axle rolling bearing 1 from slipping out from the knuckle 23 toward the vehicle outer side B. It is, therefore, unnecessary to set the width of the knuckle 23 excessively large. In addition, since the vehicle outer side B outside surfaces of the knuckle 23 and the axle rolling bearing 1 can be made consistent with the direction of the axial center 4 and located in the same plane in the diameter direction, respectively, it is possible to reduce the size of the knuckle 23 and thereby improve the degree of freedom of design.

After attaching the axle rolling bearing 1 to the knuckle 23 as described above, the hub wheel 10 is press-fitted into the central bore of the inner ring member 5 from the vehicle outer side B and then the axial section 17 of the bowl-shaped outer ring member 16 is press-fitted into the center of the hub wheel 10 through a spline S from the vehicle inner side A to engage the end portion of the axial section 17 with a nut member 18.

Meanwhile, if the axle rolling bearing 1 is to be withdrawn from the knuckle 23 for maintenance or the like, the opposite operation to that stated above is performed. That is, the nut member 18 is detached from the axial section 17, the bowl-shaped outer ring member 16 is pulled out toward the vehicle inner side A, the hub wheel 10 is pulled out of the axle rolling bearing 1 toward the vehicle outer side B, and then the axle rolling bearing 1 is withdrawn from the knuckle 23.

Figure 37:
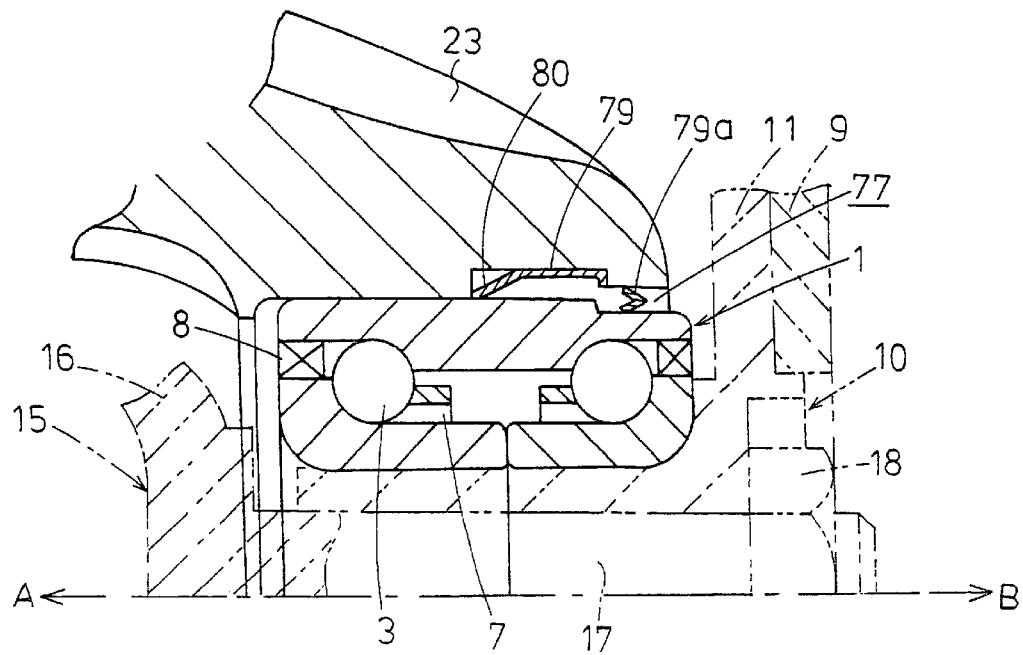
FIG. 37 is a longitudinal sectional view if the axle rolling bearing is withdrawn from the knuckle.

At this moment, load is applied to the axle rolling bearing 1 so as to pull out the axle rolling bearing 1 from the knuckle 23 toward the vehicle outer side B against the elastic force (rigidity) of the anti-slip member 76. As a result, as shown in FIG. 37, the stabilizing deformed section 79a of the anti-slip member 76, for example, is disconnected from the main body 78, making it possible to withdraw the axle rolling bearing 1 from the knuckle 23.

Figure 38:
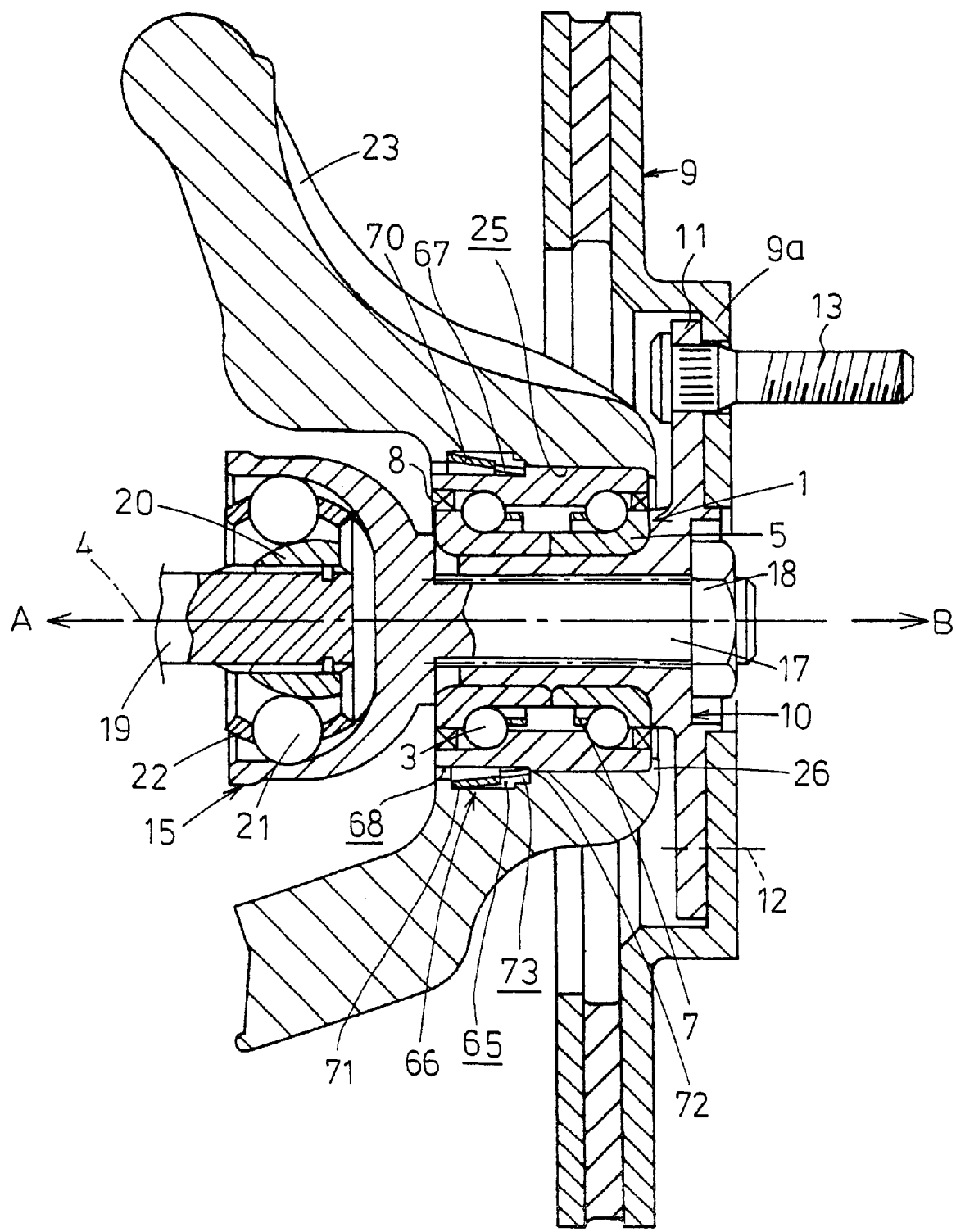
FIG. 38 is a longitudinal sectional view showing a mounting structure according to still another embodiment of the present invention.
Figure 39:
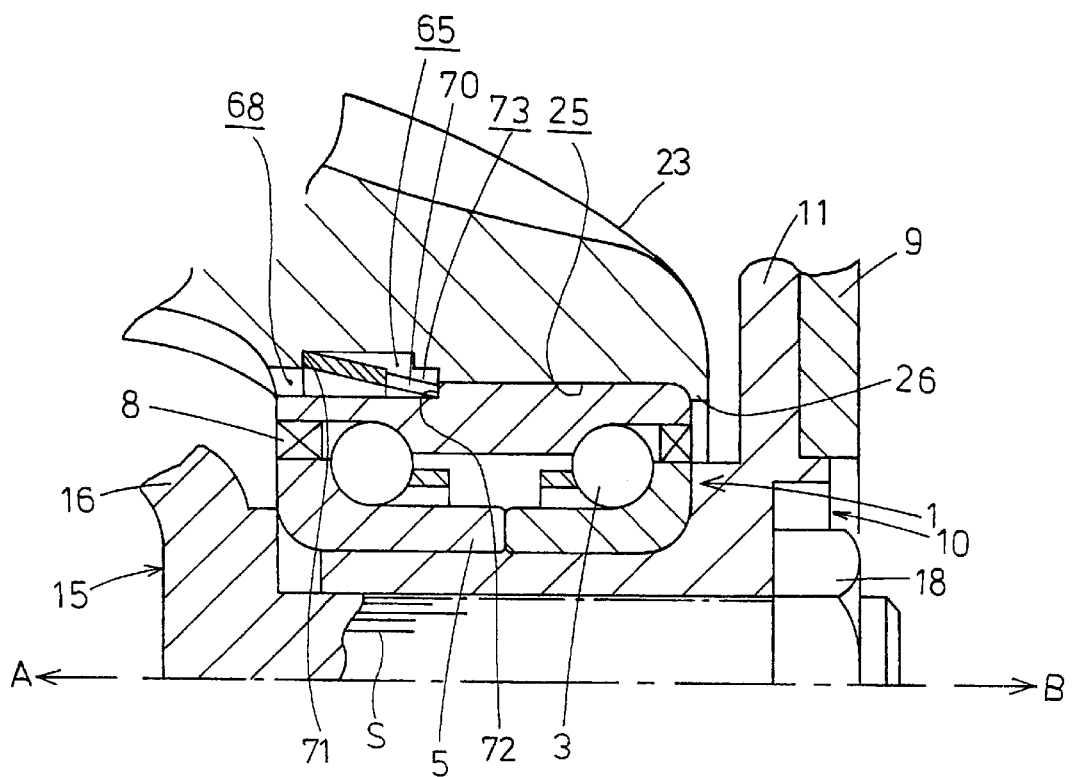
FIG. 39 is an enlarged longitudinal sectional view of the mounting structure shown in FIG. 38.

FIGS. 38 and 39 show another preferred embodiment. In this embodiment, an example of inserting an axle rolling bearing 1 into the insertion bore 25 of a knuckle 23 from a vehicle inner side A toward a vehicle outer side B is shown. FIG. 38 shows that the mounting structure in FIGS. 27 to 31 is such that constituent components are arranged oppositely with respect to the vehicle inner side A and the vehicle outer side B. That is, in the embodiment shown in FIG. 38, the axle rolling bearing 1 is inserted into the insertion bore 25 of the knuckle 23 from the vehicle inner side A toward the vehicle outer side B.

An anti-slip piece 26 in the mounting structure is formed on the vehicle outer side B end portion of the knuckle 23. This anti-slip piece 26 prevents the axle rolling bearing 1 from moving toward the vehicle outer side B.

A mounting concave section 65 and a permission concave section 73 are formed in the insertion bore 25 of the knuckle 23 toward the vehicle inner side A. An engagement concave section 68 is formed on the outer peripheral surface of an outer ring member 2 toward the vehicle inner side A.

The outside surface of an attachment deformed section 70 is engaged with a vehicle inner-side engagement surface 71 and the outside surface of a stabilizing deformed section 67 is engaged with a vehicle outer side engagement surface 72 of an engagement concave section 68, thereby preventing the axle rolling bearing 1 from moving toward the vehicle outer side B. Since the other constituent components of the axle rolling bearing 1 are the same as those in the preceding embodiments, they are indicated by the same reference numerals, respectively and will not be described herein.

In this embodiment as in the case of the preceding embodiments, it is possible to form the anti-slip member 66 annularly without providing a partial cutoff section for reducing the diameter. As a result, compared with the anti-slip member provided with the partial cutoff section, high rigidity is ensured while the axle rolling bearing 1 is attached to the knuckle 23, making it possible to ensure preventing the axle rolling bearing 1 from slipping out from the knuckle 23. Furthermore, as in the case of the preceding embodiments, it is possible to reduce the size of the knuckle 23 and thereby improve the degree of freedom of design.

Figure 40:
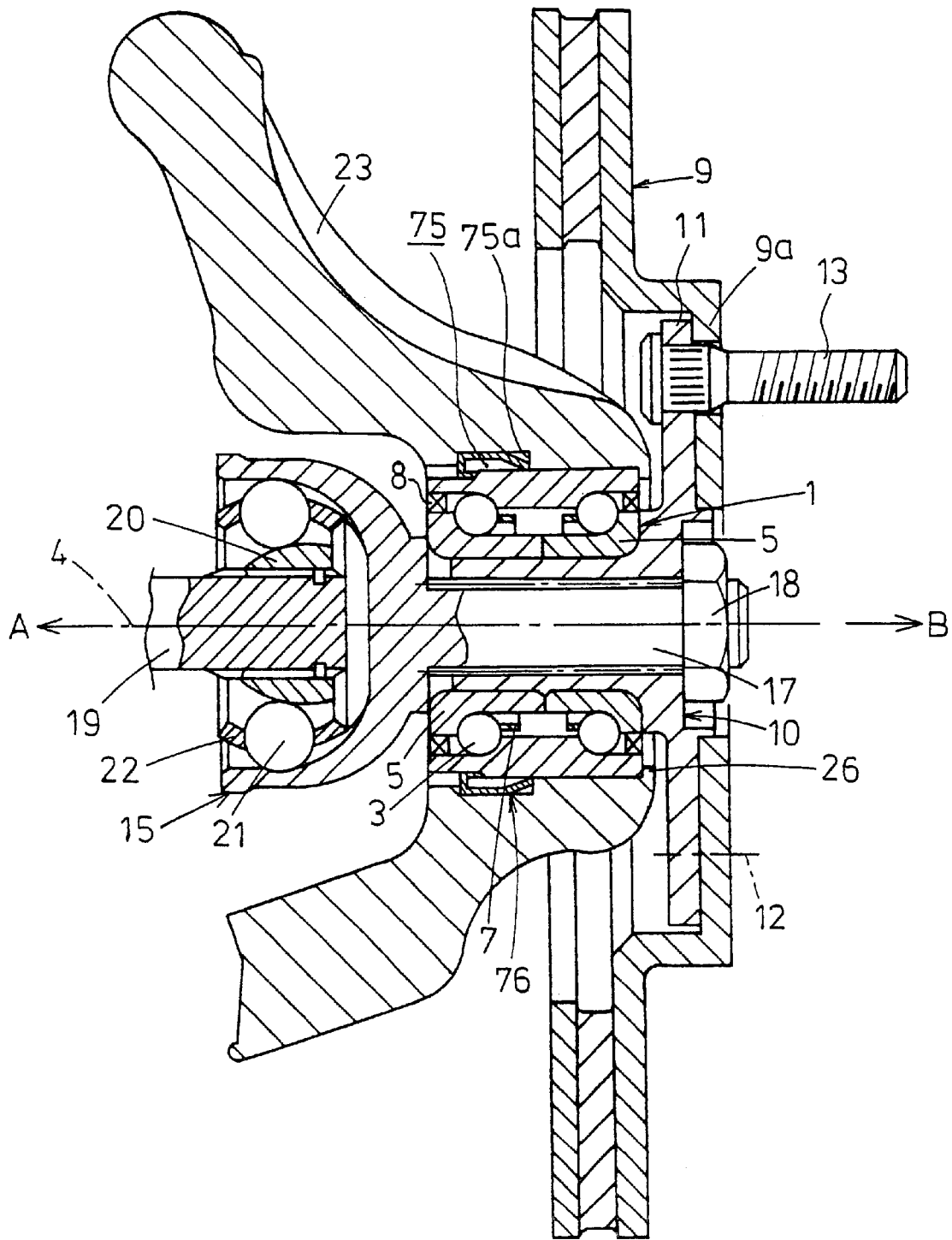
FIG. 40 is a longitudinal sectional view showing a mounting structure according to still another preferred embodiment of the present invention.
Figure 41:
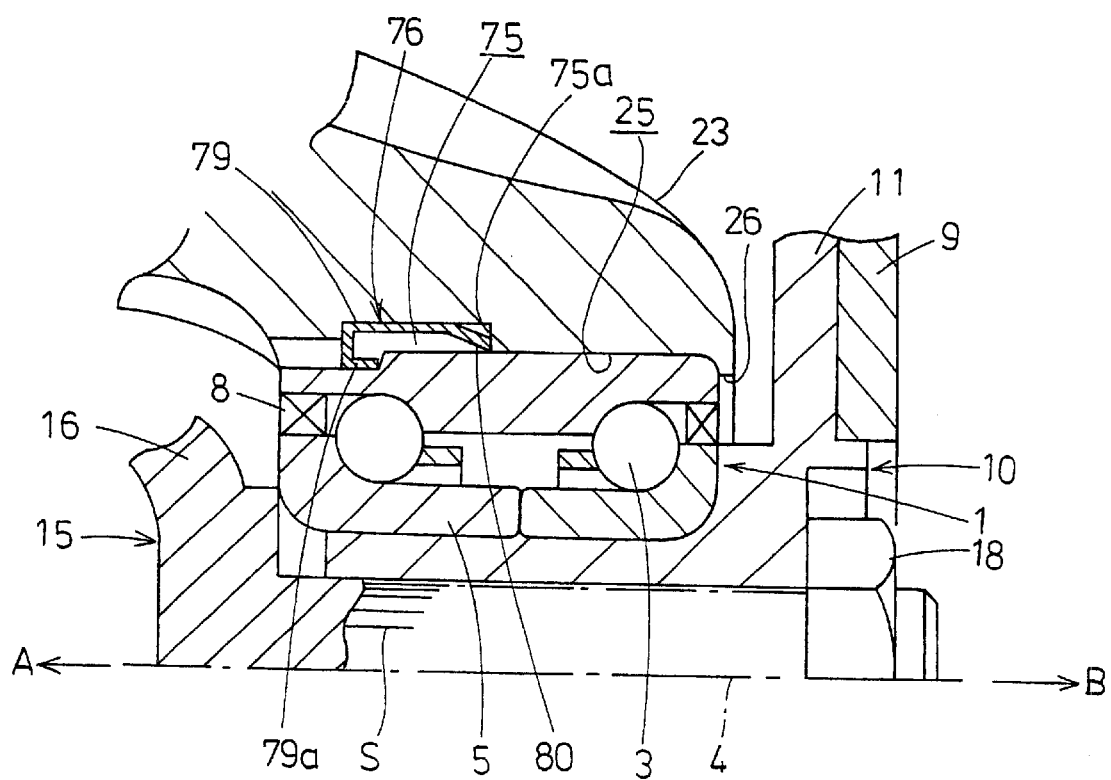
FIG. 41 is an enlarged, longitudinal sectional view of the mounting structure shown in FIG. 40.

FIGS. 40 and 41 show still another preferred embodiment. In this embodiment, an example of inserting an axle rolling bearing 1 into the insertion bore 25 of a knuckle 23 from a vehicle inner side A toward a vehicle outer side B is shown. FIG. 39 shows that the mounting structure in FIGS. 32 to 37 is such that constituent components are arranged oppositely with respect to the vehicle inner side A and the vehicle outer side B.

In this embodiment, an anti-slip piece 26 in the mounting structure is formed on the vehicle outer side B end portion of the knuckle 23. This anti-slip piece 26 prevents the axle rolling bearing 1 from moving toward the vehicle outer side B.

The end portion of the supporting bend portion 80 of the anti-slip member 76 is engaged with a vehicle outer-side engagement surface 75a of the mounting concave section 75 and the end portion of the stabilizing deformed section 79a of the anti-slip member 76 is engaged with a vehicle outer-side engagement surface 72 of vehicle outer-side of engagement concave section 77, thereby preventing the axle rolling bearing 1 from moving toward the vehicle inner side A. Since the other constituent components of the axle rolling bearing 1 are the same as those in the preceding embodiments, they are indicated by the same reference numerals, respectively and will not be described herein.

In this embodiment, it is possible to form the anti-slip member 76 annularly without providing a partial cutoff section for reducing the diameter. As a result, high rigidity is ensured while the axle rolling bearing 1 is attached to the knuckle 23, compared with the anti-slip member provided with the partial cutoff section, making it possible to ensure preventing the axle rolling bearing 1 from slipping. Furthermore, as in the case of the preceding embodiments, it is possible to reduce the size of the knuckle 23 and thereby improve the degree of freedom of design.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A rolling bearing mounting structure for mounting a rolling bearing to an insertion bore formed in a support member, wherein said support member non-rotatably supports an outer ring member provided at said rolling bearing around an axial center, and said rolling bearing mounting structure comprises:

an anti-slip piece formed on an axial end portion of the insertion bore formed in said support member for preventing said rolling bearing from slipping out of the insertion bore toward one of one side and the other side of the insertion bore in a direction of the axial center;

a first concave section formed at a position halfway along said insertion bore in the direction of the axial center, in a circumferential direction;

a second concave section formed at a position opposed to the first concave section in a diameter direction on an outer peripheral surface of the outer ring provided at said rolling bearing, in the circumferential direction; and an anti-slip member engaged with engagement surfaces formed on said first concave section and said second concave section, respectively, and preventing said rolling bearing from slipping out of the insertion bore toward the other one of one side and the other side of the support member in the direction of the axial center.

2. A rolling bearing mounting structure for mounting a rolling bearing to an insertion bore formed in a support member, wherein said support member non-rotatably supports an outer ring member provided at said rolling bearing around an axial center, said rolling bearing mounting structure comprises:
an anti-slip piece provided at said support member for preventing said rolling bearing from slipping out of the insertion bore toward one side of the support member;
a mounting concave section formed on a peripheral surface of said insertion bore, in a circumferential direction;
an anti-slip member supported by said mounting concave section; and
an engagement concave section formed on an outer peripheral surface of said outer ring member,
a support section supporting a base of said anti-slip member in a direction of the axial center is formed in said mounting concave section, an inclined engagement section inclined to have a reduced diameter toward one side and having an elastic force is formed on the base of said anti-slip member, and an engagement surface abutted and engaged by an end portion on one side of said inclined engagement section is formed in said engagement concave section, and wherein
a containing concave section for containing said inclined engagement section to allow the inclined engagement section to evade if said inclined engagement section is pressed by the outer peripheral surface of the outer ring member while said rolling bearing is being press-fitted into the insertion bore from the other side of the insertion bore, is formed on the peripheral surface of said insertion bore.

3. A rolling bearing mounting structure for mounting a rolling bearing to an insertion bore formed in a support member, wherein
said support member non-rotatably supports an outer ring member provided at said rolling bearing around an axial center,
said rolling bearing mounting structure comprises:
an anti-slip piece provided at said support member for preventing said rolling bearing from slipping out of the insertion bore toward one side of the support member;
a mounting concave section formed on an outer peripheral surface of said outer ring, in a circumferential direction;
an anti-slip member supported by said mounting concave section; and
an engagement concave section formed on a peripheral surface of said insertion bore,
a support section supporting a base of said anti-slip member in a direction of the axial center is formed in said mounting concave section, an inclined engagement section inclined to have an enlarged diameter toward the other side and having an elastic force is formed on the base of said anti-slip member, and an engagement surface abutted and engaged by an end portion on the other side of said inclined engagement section is formed in said engagement concave section, and wherein
a containing concave section for containing said inclined engagement section to allow the inclined engagement section to evade if said inclined engagement section is pressed by the peripheral surface of the insertion bore while said rolling bearing is being press-fitted into the insertion bore from the other side of the insertion bore, is formed on the outer peripheral surface of said outer ring member.

4. A rolling bearing mounting structure for mounting a rolling bearing to an insertion bore formed in a support member, wherein
said support member non-rotatably supports an outer ring member provided at said rolling bearing around an axial center,
said rolling bearing mounting structure comprises:
an anti-slip piece provided at said support member for preventing said rolling bearing from slipping out of the insertion bore toward one side of the support member;
a mounting concave section formed on a peripheral surface of said insertion bore, in a circumferential direction;
an anti-slip member supported by said mounting concave section; and
an engagement concave section formed on an outer peripheral surface of said outer ring member, and wherein
said anti-slip member comprises:
an attachment deformed section engaged with an engagement surface formed in the mounting concave section by being pressed by the peripheral surface of the insertion bore to reduce a diameter of the attachment deformed section if the anti-slip member is inserted from the other side of the insertion bore in a direction of the axial center so as to be attached to the mounting concave section, and by enlarging the diameter of the attachment deformed section if the anti-slip member has been attached to the mounting concave section; and
a stabilizing deformed section engaged with an engagement surface formed in the engagement concave section by being pressed by the outer peripheral surface of outer ring member to enlarge a diameter of the stabilizing deformed section if said rolling bearing is inserted into the insertion bore from the other side of the insertion bore in the direction of the axial center and by enlarging the diameter of the stabilizing deformed section when the engagement concave section is located at a position opposed to the mounting concave section in a diameter direction.

5. A rolling bearing mounting structure for mounting a rolling bearing to an insertion bore formed in a support member, wherein
said support member non-rotatably supports an outer ring member provided at said rolling bearing around an axial center,
said rolling bearing mounting structure comprises:
an anti-slip piece provided at said support member for preventing said rolling bearing from slipping out of the insertion bore toward one side of the support member;
a mounting concave section formed on a peripheral surface of said insertion bore, in a circumferential direction;
an anti-slip member supported by said mounting concave section; and
an engagement concave section formed on an outer peripheral surface of said outer ring member, and wherein
said anti-slip member comprises a stabilizing deformed section provided on one side of an annular main body; and an attachment deformed section provided on the other side through said main body, said attachment deformed section being engaged with an engagement surface formed on the other side of the mounting concave section by being pressed by the peripheral surface of the insertion bore to reduce a diameter of the attachment deformed section if the anti-slip member is inserted from the other side of said insertion bore in a direction of the axial center so as to be attached to the mounting concave section, and by enlarging the diameter of the attachment deformed section if the anti-slip member has been attached to the mounting concave section, and said stabilizing deformed section being engaged with an engagement surface formed on one side of the engagement concave section by being pressed by the outer peripheral surface of said outer ring member to reduce a diameter of the stabilizing deformed section if said rolling bearing is inserted into the insertion bore from the other side in the direction of the axial center after the anti-slip member has been attached to the mounting concave section and by enlarging the diameter of the stabilizing deformed section if the engagement concave section is located at a position opposed to the mounting concave section in a diameter direction.

6. A rolling bearing mounting structure for mounting a rolling bearing to an insertion bore formed in a support member, wherein said support member non-rotatably supports an outer ring member provided at said rolling bearing around an axial center, said rolling bearing mounting structure comprises:
  an anti-slip piece provided at said support member for preventing said rolling bearing from slipping out of the insertion bore toward one side of the support member;
  a mounting concave section formed on a peripheral surface of said insertion bore, in a circumferential direction;
  an anti-slip member supported by said mounting concave section; and
  an engagement concave section formed on an outer peripheral surface of said outer ring member, said anti-slip member comprises an engagement section provided on one side of an annular main body, and engaged with an engagement surface formed on one side of the mounting concave section if the anti-slip member has been attached to the mounting concave section; an attachment deformed section provided on the other side of said main body; and a stabilizing deformed section provided on the attachment deformed section, and wherein said attachment deformed section is engaged with an engagement surface formed on the other side of the mounting concave section by being pressed by the peripheral surface of the insertion bore to reduce a diameter of the attachment deformed section if the anti-slip member is inserted from the other side of the insertion bore in a direction of the axial center so as to be attached to the mounting concave section, and by enlarging the diameter of the attachment deformed section if the anti-slip member has been attached to the mounting concave section; and said stabilizing deformed section is engaged with an engagement surface formed on one side of the engagement concave section by being pressed by the outer peripheral surface of said outer ring member to enlarge a diameter of said stabilizing deformed section if said rolling bearing is inserted into the insertion bore from the other side of the insertion bore in the direction of the axial center after the anti-slip member has been attached to the mounting concave section, and by reducing the diameter of said stabilizing deformed section if the engagement concave section formed on the outer peripheral surface of said outer ring member is located at a position opposed to the mounting concave section in a diameter direction.

* * * * *